US012782731B2

(12) United States Patent
Jung et al.

(10) Patent No.: US 12,782,731 B2
(45) Date of Patent: *Nov. 3, 2026

(54) DISPLAY DEVICE

(71) Applicant: Samsung Display Co., LTD., Yongin-si (KR)

(72) Inventors: Ji Won Jung, Yongin-si (KR); Guanghai Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 316 days.

This patent is subject to a terminal disclaimer.

(21) Appl. No.: 18/436,979

(22) Filed: Feb. 8, 2024

(65) Prior Publication Data

US 2024/0411133 A1 Dec. 12, 2024

(30) Foreign Application Priority Data

Jun. 8, 2023 (KR) ........................ 10-2023-0073609

(51) Int. Cl.
*G02B 27/01* (2006.01)
*G09G 3/00* (2006.01)
*G09G 3/3233* (2016.01)

(52) U.S. Cl.
CPC ......... *G02B 27/0172* (2013.01); *G09G 3/003* (2013.01); *G09G 3/3233* (2013.01); *G02B 2027/0174* (2013.01); *G02B 2027/0178* (2013.01); *G09G 2300/0861* (2013.01)

(58) Field of Classification Search
CPC ... G02B 27/0172; G09G 3/003; G09G 3/3233
See application file for complete search history.

(56) References Cited

U.S. PATENT DOCUMENTS

| | | | | |
|---|---|---|---|---|
| 8,400,695 | B2 | 3/2013 | Kroll et al. | |
| 2014/0160178 | A1* | 6/2014 | Hong | G09G 3/2007 345/80 |
| 2018/0203231 | A1* | 7/2018 | Glik | G02B 27/0081 |
| 2019/0294109 | A1* | 9/2019 | Lee | G03H 1/2294 |
| 2021/0335896 | A1 | 10/2021 | Choi et al. | |

FOREIGN PATENT DOCUMENTS

JP 2018060743 A 4/2018

* cited by examiner

*Primary Examiner* — Lucy P Chien
(74) *Attorney, Agent, or Firm* — CANTOR COLBURN LLP

(57) ABSTRACT

The present disclosure relates to a display device. The display device includes at least one spatial light modulator displaying an extended reality content image, a surface light source device located behind the at least one spatial light modulator and providing image display light of a first resolution to the at least one spatial light modulator as background light, and at least one image transmission member forming a display path of the extended reality content image. The surface light source device includes an organic light emitting display unit in which a plurality of light emitting pixels performing surface light emission are arranged and an emission driving circuit driving the plurality of light emitting pixels. Each of the plurality of sub-light emitting pixels includes a plurality of pixel drivers and a light emitting element.

20 Claims, 19 Drawing Sheets

DISPLAY DEVICE

This application claims priority to Korean Patent Application No. 10-2023-0073609, filed on Jun. 8, 2023, and all the benefits accruing therefrom under 35 U.S.C. § 119, the content of which in its entirety is herein incorporated by reference.

BACKGROUND

1. Field

The present disclosure relates to a display device.

2. Description of the Related Art

Recently, with the development of electronic devices and display devices that can implement virtual reality (VR), technologies that can realize augmented reality (AR), mixed reality (MR), and extended reality content images such as, for example, holograms have been researched as a next step of virtual reality.

Unlike virtual reality that is based on a completely virtual world, augmented reality is a display technology that may further increase the reality effect by superimposing virtual objects or image information on a real-world environment. In some cases, stereoscopic imaging technology using a hologram method can fundamentally avoid fatigue that occurs in a conventional stereoscopic method in which stereoscopic images are seen using binocular disparity. Therefore, stereoscopic imaging technology using the hologram method is drawing attention as a next-generation stereoscopic imaging technology to ultimately be reached.

In the case of extended reality content images such as, for example, holograms, since an actual image formed is directly seen with the eyes without using an optical illusion, a 3D effect may be experienced by a user in which the user feels no different compared to seeing a corresponding real object or environment. Therefore, extended reality content images may provide advantages in that watching extended reality content images for an extended period of time does not cause fatigue.

Some methods of displaying an extended reality content image such as, for example, a hologram may employ a spatial light modulator, and in some cases, the performance of the spatial light modulator may serve as a factor that determines the 3D effect and performance. Recently, a liquid crystal display panel has been employed as a spatial light modulator. Accordingly, the emission structure of a light emitting panel utilized as a background light source such as, for example, a backlight may serve as a factor that may determine the display quality and viewing angle of an extended reality content image.

SUMMARY

Aspects of the present disclosure provide a display device capable of modulating the arrangement structure of light emitting pixels and the stacked structure of each light emitting element in a surface light source device which provides background light to a spatial light modulator. In some aspects, the display device is capable of displaying an extended reality content image such as, for example, a hologram using an ultra-low resolution surface light source.

Aspects of the present disclosure also provide a display device capable of increasing the resolution and 3D effect of an extended reality content image such as, for example, a hologram by modulating the ultra-low resolution of a surface light source device.

However, aspects of the present disclosure are not restricted to the examples set forth herein. The above and other aspects of the present disclosure will become more apparent to one of ordinary skill in the art to which the present disclosure pertains by referencing the detailed description of the present disclosure given herein.

According to an embodiment of the disclosure, a display device includes at least one spatial light modulator displaying an extended reality content image, a surface light source device located behind the at least one spatial light modulator and providing image display light of a first resolution to the at least one spatial light modulator as background light, and at least one image transmission member forming a display path of the extended reality content image, wherein the surface light source device includes an organic light emitting display unit in which a plurality of light emitting pixels performing surface light emission are arranged and an emission driving circuit driving the plurality of sub-light emitting pixels, and each of the plurality of sub-light emitting pixels includes a plurality of pixel drivers and a light emitting element.

In an embodiment, the emission driving circuit generates gate control signals and analog image signals for driving the plurality of sub-light emitting pixels at a same timing in units of at least one frame, the display device supplies the gate control signals to a first gate driver in units of at least one frame, and the display device supplies the analog image signals simultaneously supplied to the plurality of sub-light emitting pixels.

According to an embodiment of the disclosure, a display device including at least one spatial light modulator displaying an extended reality content image, a surface light source device located behind the at least one spatial light modulator and providing image display light of a first resolution to the at least one spatial light modulator as background light, and at least one image transmission member forming a display path of the extended reality content image, wherein the surface light source device includes an organic light emitting display unit in which a plurality of light emitting pixels performing surface light emission are arranged and an emission driving circuit driving the plurality of sub-light emitting pixels. Each of the plurality of sub-light emitting pixels includes a plurality of pixel drivers and a light emitting element, and the light emitting element included in each of the plurality of sub-light emitting pixels is formed in the organic light emitting display unit in at least one of or a combination of different shapes including: a sector shape, a triangular shape, a rhombus shape, a quadrangular shape, a circular shape, a semicircular shape, and an elliptical shape.

In an embodiment, the emission driving circuit generates gate control signals and analog image signals for driving the plurality of sub-light emitting pixels at a same timing in units of at least one frame, the display device supplies the gate control signals to a first gate driver in units of at least one frame, and the display device supplies the analog image signals simultaneously to the plurality of sub-light emitting pixels.

In a display device according to an embodiment of the present disclosure, the light emitting pixel arrangement structure and surface light emitting structure of a surface light source device are simplified such that ultra-low resolution background light can be provided to a spatial light modulator. Therefore, aspects described herein support increasing the efficiency of manufacturing a display device that displays an extended reality content image such as, for example, a hologram.

In addition, in a display device according to an embodiment of the present disclosure, the RC value of a light emitting element of each light emitting pixel is reduced. Therefore, as described herein support a display device capable of improving the amount of light emitted from each light emitting element and further increasing the resolution and 3D effect of an extended reality content image such as, for example, a hologram.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, illustrative embodiments will be described in detail with reference to the accompanying drawings.

Figure 1:
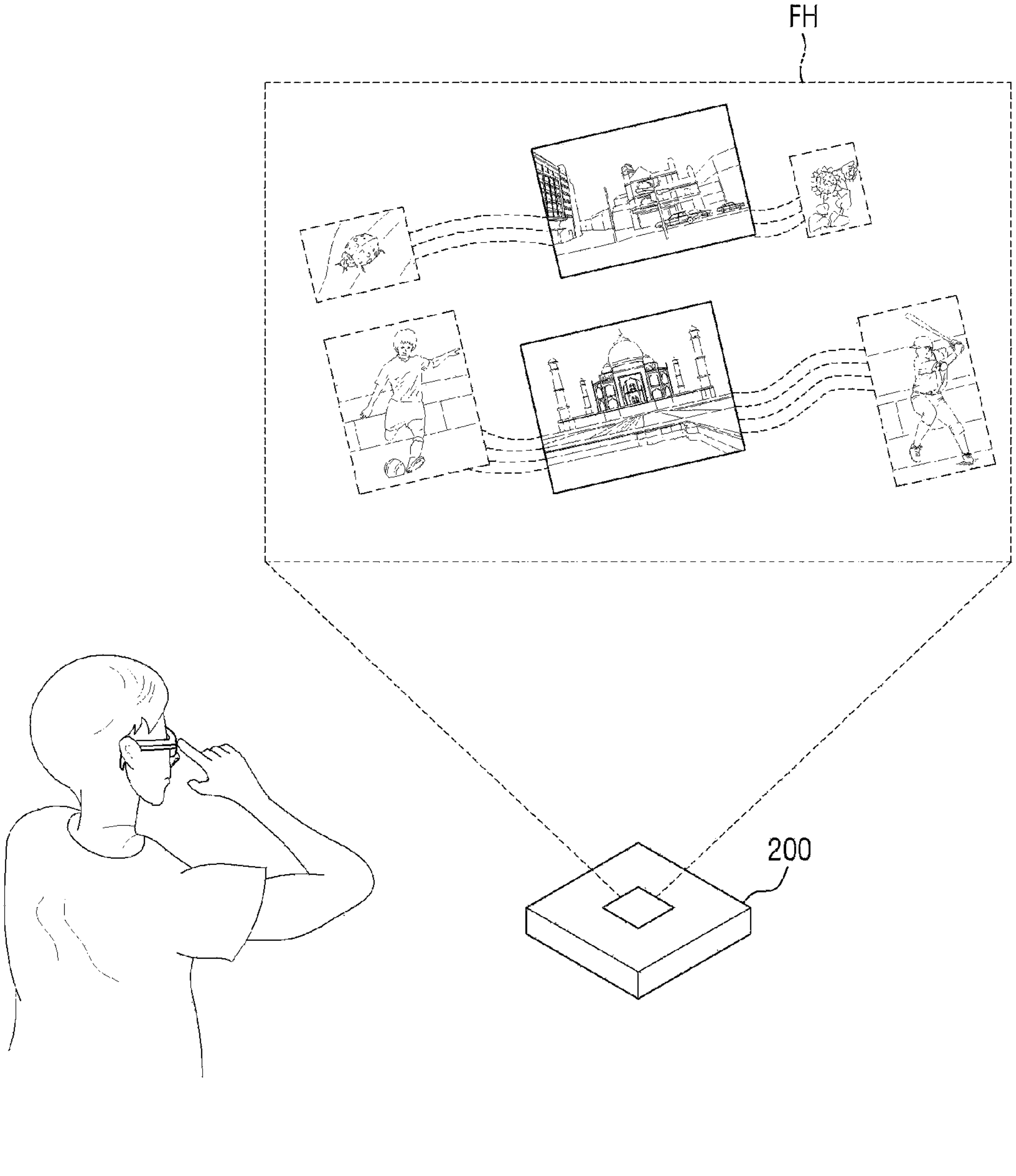
FIG. 1 illustrates a utilization example of a projector-type extended reality content image display device according to an embodiment of the present disclosure.
Figure 2:
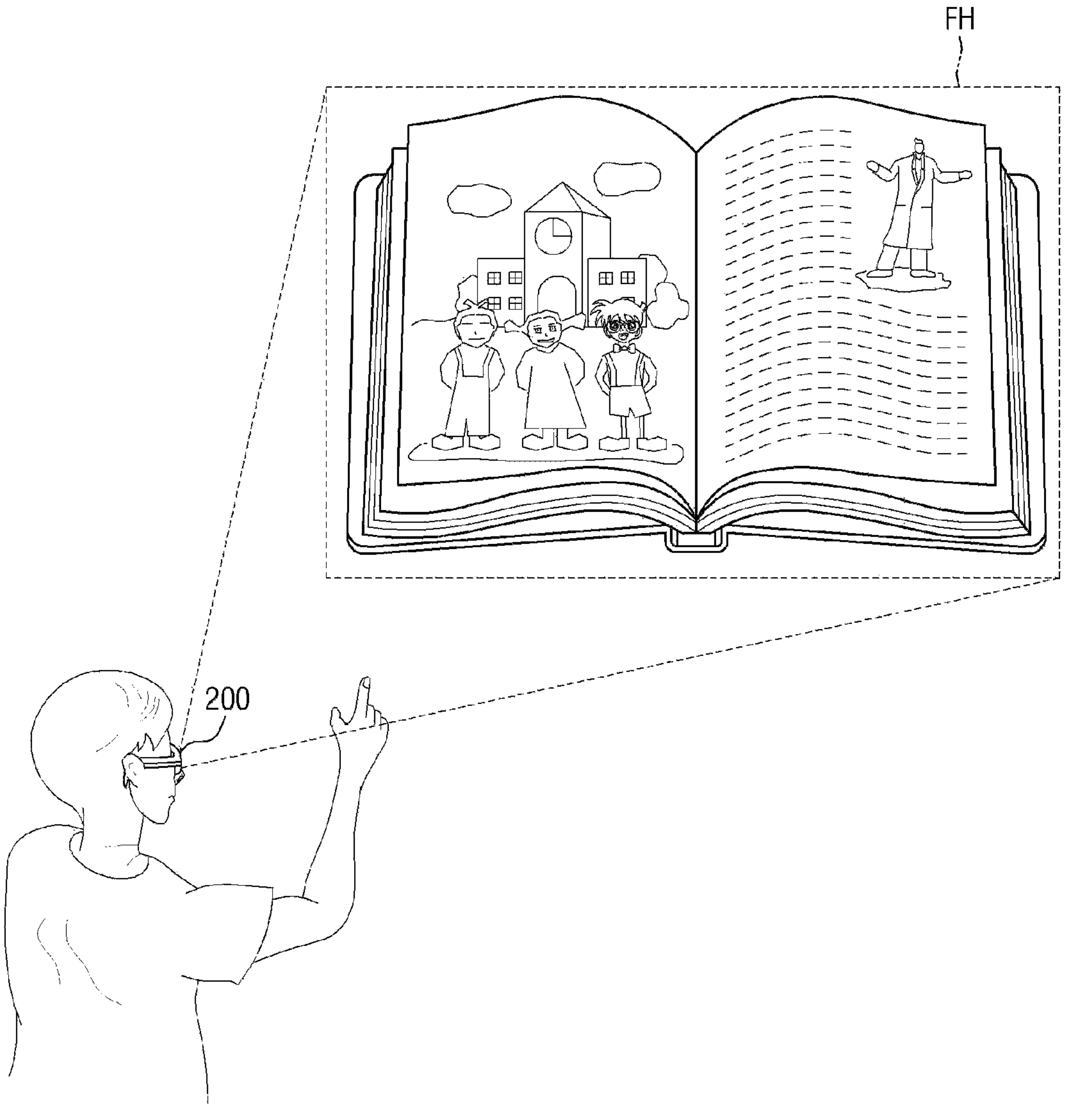
FIG. 2 illustrates a utilization example of a glasses-type extended reality content image display device according to an embodiment of the present disclosure.

FIG. 1 illustrates a utilization example of an extended reality content image display device 200 of a projector-type according to an embodiment of the present disclosure. FIG. 2 illustrates a utilization example of an extended reality content image display device 200 of a glasses-type according to an embodiment of the present disclosure.

Referring to FIGS. 1 and 2, a display device 200 according to an embodiment is capable of displaying an extended reality content image such as, for example, a hologram. In the example embodiment of FIG. 1, the display device 200 may be formed as a projector type. In an example, the display device 200 of a projector type can be easily carried by a user and may be mounted or assembled in structures on a ceiling or a wall or in a specific space. Display device 200 may also be referred to as an extended reality content image display device.

In the example embodiment of FIG. 2, the display device 200 may be integrally formed with a glasses-type frame. In an example, the display device 200 formed with the glasses-type frame can be easily carried and worn or taken off by a user or may be mounted or assembled in the glasses-type frame.

According to example aspects of the present disclosure, the display device 200 may display and provide an extended reality content image FH such as, for example, a hologram, in a specific space through a 3D lens or sheet, such that the extended reality content image FH can be recognized in a real space visible to a user's eyes. The real space may refer to a physical environment. The extended reality content image FH may include two dimensional (2D) or three dimensional (3D) extended reality image content, which may include a combination of graphic images, camera-photographed images and text images, and sound content.

Figure 3:
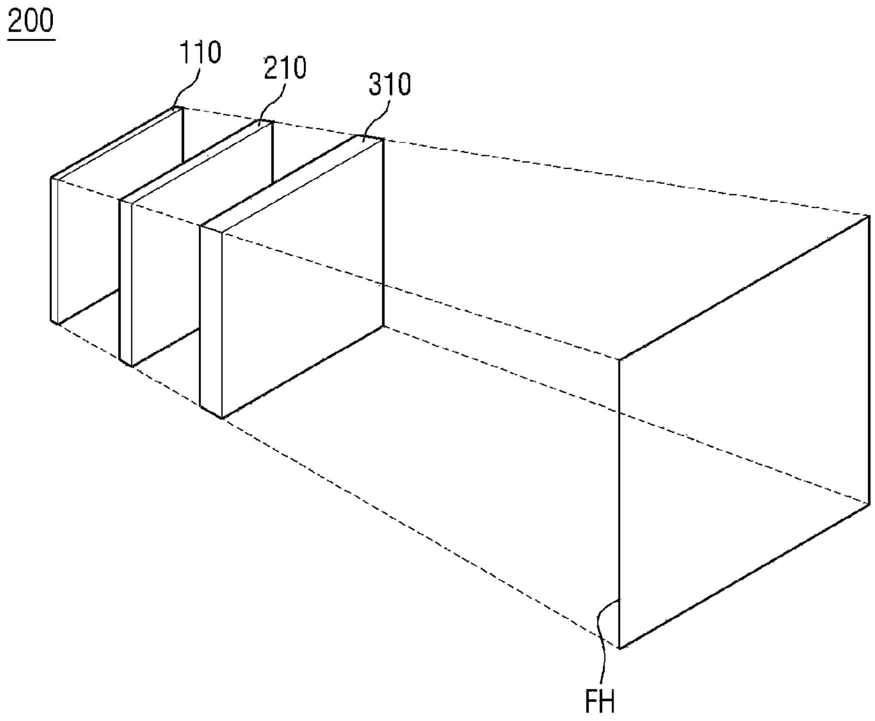
FIG. 3 is an exploded perspective view schematically illustrating the configuration of an extended reality content image display device according to an embodiment.
Figure 4:
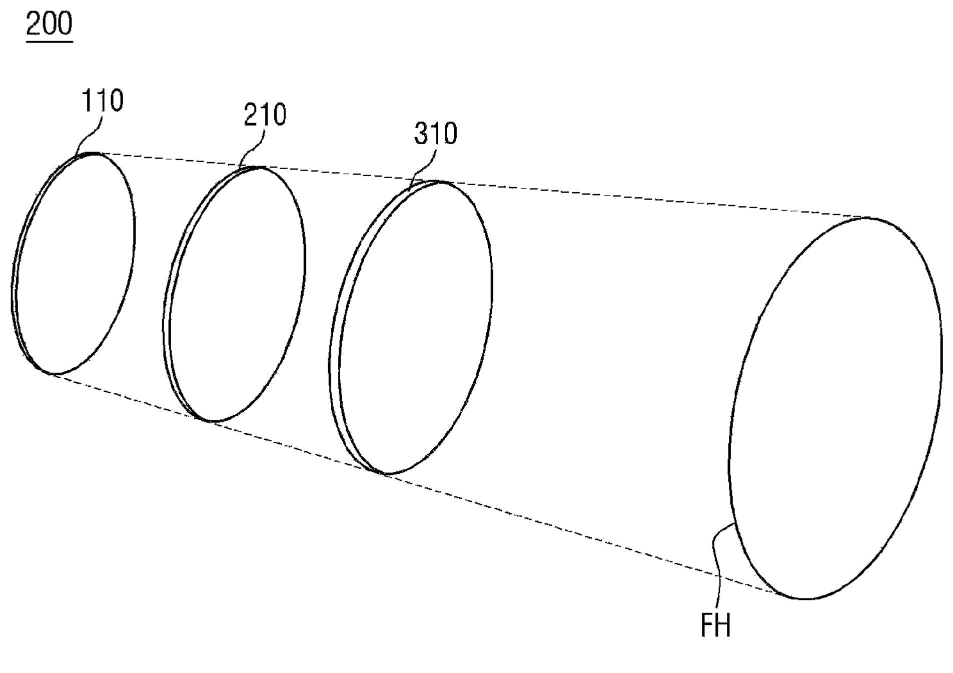
FIG. 4 is an exploded perspective view schematically illustrating the configuration of an extended reality content image display device according to an embodiment.

FIG. 3 is an exploded perspective view schematically illustrating the configuration of an extended reality content image display device 200 according to an embodiment. FIG. 4 is an exploded perspective view schematically illustrating the configuration of an extended reality content image display device 200 according to an embodiment.

Referring to FIG. 3, the display device 200 of FIGS. 1 and 2 for displaying an extended reality content image such as, for example, a hologram may be polygon shaped. For example, the shape of the display device 200 may be a polygonal plane such as, for example, a square or rectangular plane or a quadrangular plate. In some other embodiments, referring to FIG. 4, the display device 200 may be circular shaped, oval shaped, or the like. For example, the shape of the display device 200 may be a disk or a circular plate with a curved rim such as, for example, a circular or elliptical rim.

In one or more embodiments, the display device 200 may be a quadrangular shape (e.g., as illustrated at FIG. 3) or a circular plate (e.g., as illustrated at FIG. 4) and include at least one spatial light modulator 210, at least one surface light source device 110, and at least one image transmission member 310. Each of the spatial light modulator 210 and the surface light source device 110 may be shaped according to the planar structure or shape of the display device 200. For example, each of the spatial light modulator 210 and the surface light source device 110 may be a quadrangular shape (e.g., as illustrated at FIG. 3) or a circular plate (e.g., as illustrated at FIG. 4) according to the planar structure or shape of the display device 200. In some aspects, the at least one image transmission member 310 may be shaped according to the planar structure or shape of the display device 200. For example, the at least one image transmission member 310 may be a quadrangular shape (e.g., as illustrated at FIG. 3) or a circular plate (e.g., as illustrated at FIG. 4) according to the planar structure or shape of the display device 200.

In the examples of FIGS. 3 and 4, single instances of the surface light source device 110, spatial light modulator 210, and image transmission member 310 are illustrated. However, aspects of the present disclosure are not limited thereto, and it is to be understood that the display device 200 may include multiple instances of the surface light source device 110, spatial light modulator 210, and image transmission member 310. In some embodiments, each combination of a surface light source device 110, spatial light modulator 210, and image transmission member 310 may generate a respective extended reality content image FH.

The at least one surface light source device 110 is disposed behind the spatial light modulator 210 such that the at least one surface light source device 110 may provide background light as a backlight to a rear surface of the spatial light modulator 210.

The surface light source device 110 may include an organic light emitting display device (OLED), an inorganic electroluminescent (EL) display device, a quantum dot light emitting display device (QED), a cathode ray tube (CRT) display device, a micro-light emitting diode (LED) display device, or a nano-LED display device.

A case where an organic light emitting display panel is applied as the surface light source device 110 will be described herein as an example. However, the surface light source device 110 in accordance with example aspects of the present disclosure is not limited to an organic light emitting display panel or device, and other display panels or devices listed herein or known in the art can also be applied within the scope sharing the technical spirit.

The surface light source device 110 applied as an organic light emitting display panel may be formed to have a different resolution from the at least one spatial light modulator 210. In particular, for example, the surface light source device 110 may be formed to have a lower resolution than the at least one spatial light modulator 210.

The surface light source device 110 may receive extended reality content image data from the outside (e.g., from a device different from the display device 200) and may arrange the extended reality content image data according to a preset first resolution. In an example, the display device 200 may convert the extended reality content image data of the first resolution into analog image signals and display the extended reality content image data on emission areas of an organic light emitting display surface.

The extended reality content image display light of the first resolution displayed on the organic light emitting display surface of the surface light source device 110, that is, on the emission areas of the surface light source device 110, is provided to the rear surface of the spatial light modulator 210 as a backlight, that is, background light.

The spatial light modulator 210 generates an extended reality content image according to the extended reality content image data from the outside and supplies the extended reality content image to the image transmission member 310 in front of the spatial light modulator 210, such that the extended reality content image is displayed in an image display direction and space of the image transmission member 310. Expressed another way, the spatial light modulator 210 may supply the extended reality content image in the image display direction and space of the image transmission member 310.

The spatial light modulator 210 may include a liquid crystal display (LCD) device that displays an extended reality content image of a second resolution on a front surface of the spatial light modulator 210. For example, the LCD may display the extended reality content image on the front surface of the spatial light modulator 210 by using the background light of the first resolution provided from the surface light source device 110 located behind the spatial light modulator 210.

A case where a liquid crystal display panel is applied as the spatial light modulator 210 will be described herein as an example. However, embodiments described herein are not limited to a liquid crystal display panel or device, and other display devices listed herein or known in the art can also be applied within the scope sharing the technical spirit.

The spatial light modulator 210 applied as a liquid crystal display panel may be formed to have the same resolution as or a different resolution from the at least one surface light source device 110. In an embodiment, the spatial light modulator 210 may be formed to have a higher resolution than the at least one surface light source device 110.

The spatial light modulator 210 may receive extended reality content image data input from the outside and may arrange the extended reality content image data according to a preset second resolution. In an example, the spatial light modulator 210 may convert the extended reality content image data of the second resolution into analog image signals and display the analog image signals on an image display surface on which a plurality of pixels are arranged. In some embodiments, the second resolution of the spatial light modulator 210 is set to be higher than the first resolution of the surface light source device 110. Accordingly, for example, the spatial light modulator 210 may generate an extended reality content image of the second resolution higher than the first resolution by using the background light of the first resolution provided from the at least one surface light source device 110 behind the spatial light modulator 210 and display the generated extended reality content image on the front surface of the spatial light modulator 210.

The at least one image transmission member 310 may transmit an extended reality content image FH of a third resolution, in which the background light of the first resolution and the extended reality content image of the second resolution are mixed. The at least one image transmission member 310 may transmit the extended reality content image FH through a preset light path to direct and provide the extended reality content image FH in a preset image display direction. Specifically, for example, the image transmission member 310 may form a display path (or light path) of the extended reality content image FH such that the extended reality content image FH of the third resolution can be displayed on a preset space or display surface.

In some embodiments, the third resolution is a mixture of the first resolution and the second resolution. For example, the third resolution may be different from the first resolution and the second resolution. In some examples, the third resolution may be between the first resolution and the second resolution.

The image transmission member 310 may include at least one optical member from among an optical waveguide (e.g., a prism), a diffusion lens, and a focusing lens. In an example, the extended reality content image FH displayed through the at least one spatial light modulator 210 is directed to a specific space through at least one of the optical waveguide, the diffusion lens, and the focusing lens and recognized as the extended reality content image FH of the third resolution in a real space. The extended reality content image FH displayed as a hologram type by the image transmission member 310 may include 2D or 3D extended reality image content. In an example, the 2D or 3D extended reality image content may include a combination of graphic images, camera-photographed images and text images, and sound content.

Figure 5:
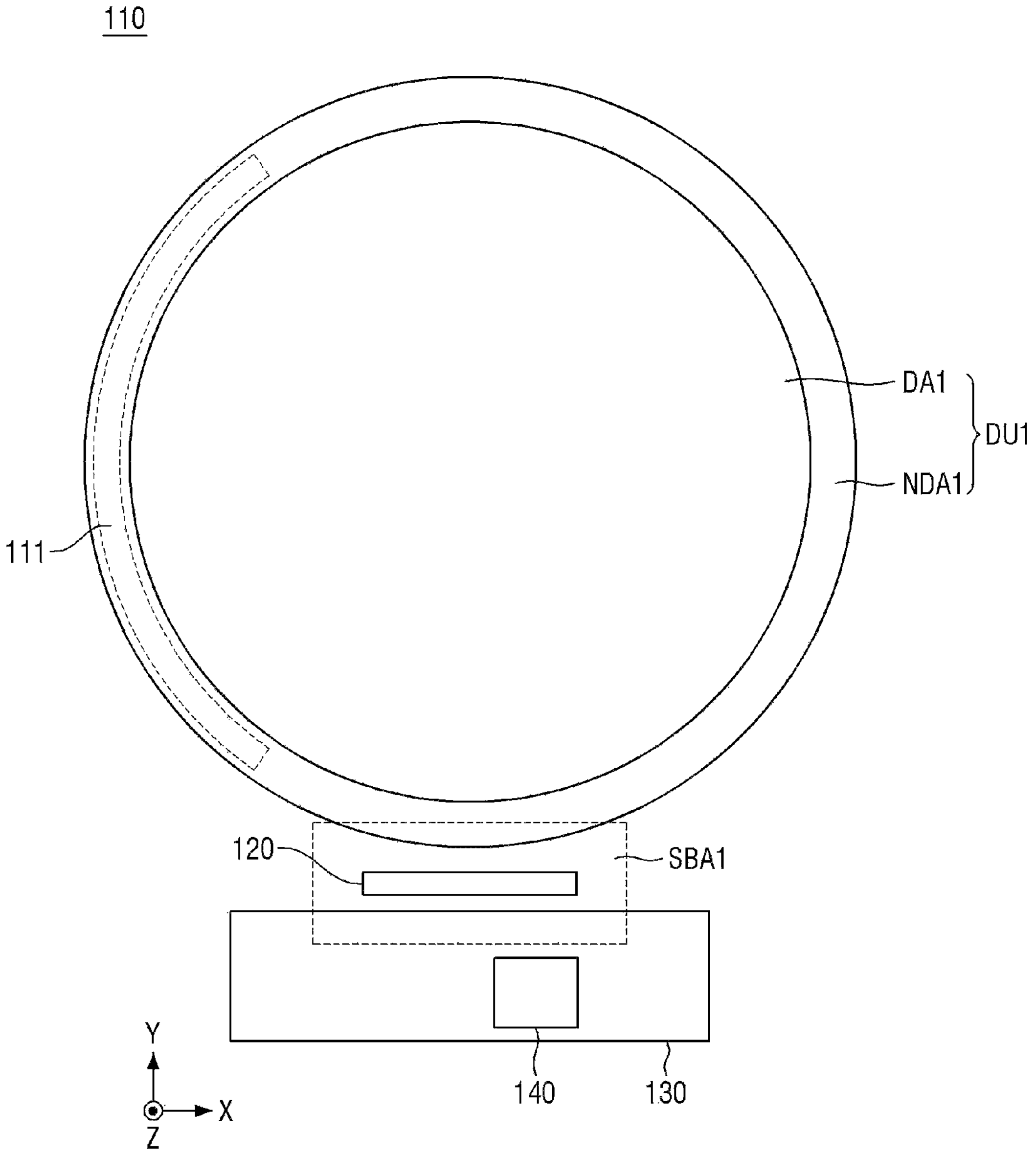
FIG. 5 is a detailed plan view of a surface light source device illustrated in FIG. 4.

FIG. 5 is a detailed plan view of a surface light source device 110 in accordance with one or more embodiments of the present disclosure. For example, FIG. 5 is a detailed plan view of the surface light source device 110 illustrated in FIG. 4. It is to be understood that aspects of the surface light source device 110 described in FIG. 5 may be similarly applied to the surface light source device 110 of FIG. 3.

Referring to FIG. 5, the at least one surface light source device 110 is formed such that the at least one surface light source device 110 may serve as a light source capable of providing background light to the rear surface of the at least one spatial light modulator 210.

The surface light source device 110 may have a rectangular shape, a square shape, a circular shape, an elliptical shape, or a quadrate shape in a plan view. For example, in an embodiment in which the spatial light modulator 210 is formed in a circular shape in a plan view, the surface light source device 110 may have a circular shape corresponding to the circular plate shape of the spatial light modulator 210. However, embodiments are not limited thereto. For example, in an embodiment in which the spatial light modulator 210 is formed in a rectangular shape with long sides extending in a horizontal direction and short sides extending in a vertical direction, the surface light source device 110 may be formed in a rectangular shape with long sides extending in a horizontal direction and short sides extending in a vertical direction. In some embodiments, the surface light source device 110 and the spatial light modulator 210 may also be formed in a rectangular shape with long sides located in a horizontal direction and short sides located in a vertical direction.

Referring to FIG. 5, the at least one surface light source device 110 includes a surface light emitting unit DU1 which displays background light as a surface light source, an emission driving circuit 120 which drives light emitting pixels of the surface light emitting unit DU1, and a first data processor 140 which supplies extended reality content image data of a first resolution to the emission driving circuit 120.

Specifically, for example, the at least one surface light source device 110 includes the surface light emitting unit DU1 which displays background light as a surface light source. The surface light emitting unit DU1 may include a plurality of light emitting pixels and may emit background light, which is a surface light source, through the light emitting pixels. The light emitting pixels in the surface light emitting unit DU1 are formed and arranged to correspond to the preset first resolution.

The first data processor 140 may extract extended reality content image data of the first resolution from extended reality content image data input from the outside. Alternatively, the first data processor 140 may convert the extended reality content image data input from the outside into the extended reality content image data of the preset first resolution. The first data processor 140 may transmit the extended reality content image data of the first resolution to the emission driving circuit 120 of the surface light source device 110.

The emission driving circuit 120 may output data signals and voltages for driving the light emitting pixels of the surface light emitting unit DU1. Specifically, for example, the emission driving circuit 120 may receive extended reality content image data from the first data processor 140 such as, for example, a graphic card and arranges the extended reality content image data according to the preset first resolution. In an example, the emission driving circuit 120 may convert the extended reality content image data of the first resolution into analog image signals and supply the analog image signals to the light emitting pixels arranged on an organic light emitting display surface DA1 of the surface light emitting unit DU1.

Figure 6:
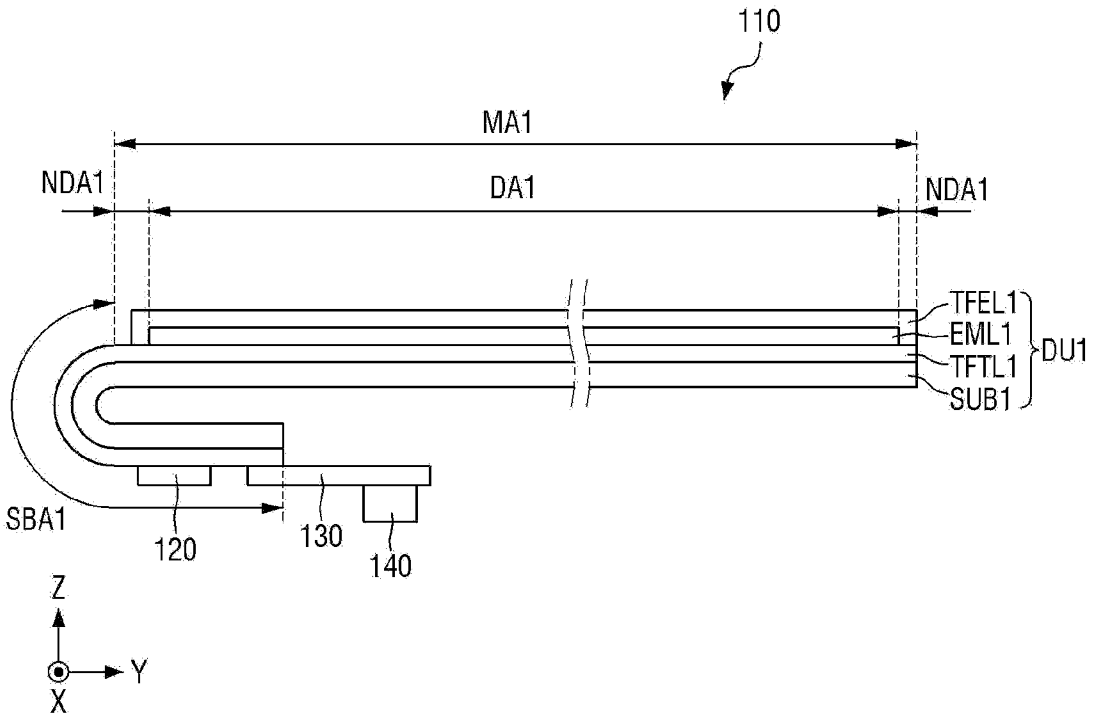
FIG. 6 is a side cross-sectional view illustrating the cross-sectional structure of the surface light source device illustrated in FIG. 4.

FIG. 6 is a side cross-sectional view illustrating a cross-sectional structure of a surface light source device 110 in accordance with one or more embodiments of the present disclosure. For example, FIG. 6 is a side cross-sectional view illustrating the cross-sectional structure of the surface light source device 110 illustrated in FIG. 4. It is to be understood that aspects of the surface light source device 110 described in FIG. 6 may be similarly applied to the surface light source device 110 of FIG. 3.

Referring to FIGS. 5 and 6, the surface light emitting unit DU1 may be divided into a first main area MA1 and a first sub-area SBA1. The first main area MA1 may include the organic light emitting display surface DA1 on which a plurality of light emitting pixels performing surface emission are arranged and a first non-display area NDA1 disposed around the organic light emitting display surface DA1.

Light emitted from respective emission areas or opening areas of the light emitting pixels may be displayed on the organic light emitting display surface DA1 as background light. In one or more embodiments, the light emitting pixels of the organic light emitting display surface DA1 may include pixel drivers including switching elements, a pixel defining layer defining the emission areas or the opening areas, and self-light emitting elements.

The first non-display area NDA1 may be an area outside the organic light emitting display surface DA1. The first non-display area NDA1 may be defined as an edge area of the first main area MA1. The first non-display area NDA1 may include a first gate driver 111 supplying gate signals to gate lines and fan-out lines (not illustrated) connecting the emission driving circuit 120 and the organic light emitting display surface DA1.

The first sub-area SBA1 may extend from a side of the first main area MA1. The first sub-area SBA1 may include a flexible material that can be bent, folded, or rolled. For example, when the first sub-area SBA1 is bent, the first sub-area SBA1 (or a portion of the first sub-area SBA1) may be overlapped by the first main area MA1 in a thickness direction (Z-axis direction). The first sub-area SBA1 may include the emission driving circuit 120 and a pad unit (not illustrated) connected to a first circuit board 130. In some embodiments, the first sub-area SBA1 may be omitted, and the emission driving circuit 120 and the pad unit may be disposed in the first non-display area NDA1.

According to one or more embodiments of the present disclosure, at least one emission driving circuit 120 may be formed as an integrated circuit and mounted in the first non-display area NDA1 by a chip on glass (COG) method, a chip on plastic (COP) method, or an ultrasonic bonding method. For example, the emission driving circuit 120 may be disposed in the first sub-area SBA1 and may be overlapped by the first main area MA1 in the thickness direction (Z-axis direction) by the bending of the first sub-area SBA1. In another example, the emission driving circuit 120 may be mounted on the first circuit board 130.

The first circuit board 130 may be attached onto the pad unit of the first non-display area NDA1 using an anisotropic conductive film (ACF). Lead lines of the first circuit board 130 may be electrically connected to the pad unit of the first non-display area NDA1. The first circuit board 130 may be a flexible printed circuit board, a printed circuit board, or a flexible film such as, for example, a chip-on-film.

A first substrate SUB1 of the surface light emitting unit DU1 illustrated in FIG. 6 may be a base substrate or a base member. The first substrate SUB1 may be a flexible substrate that can be bent, folded, or rolled. For example, the first substrate SUB1 may include a glass material or a metal material. However, embodiments are not limited thereto. In another example, the first substrate SUB1 may include polymer resin such as, for example, polyimide (PI).

A first thin-film transistor layer TFTL1 may be disposed on the first substrate SUB1. The first thin-film transistor layer TFT1 may include a plurality of thin-film transistors constituting pixel drivers of light emitting pixels. The first thin-film transistor layer TFTL1 may further include gate lines, data lines, power lines, gate control lines, fan-out lines connecting the emission driving circuit 120 and the data lines, and lead lines connecting the emission driving circuit 120 and the pad unit. In an example implementation in which the first gate driver 111 is formed on a side of the first non-display area NDA1 of the surface light emitting unit DU1, the first gate driver 111 may include thin-film transistors.

The first thin-film transistor layer TFTL1 may be disposed on the organic light emitting display surface DA1, the first non-display area NDA1, and the first sub-area SBA1. The thin-film transistors of the pixels, the gate lines, the data lines, and the power lines of the first thin-film transistor layer TFTL1 may be disposed on the organic light emitting display surface DA1. The gate control lines and the fan-out lines of the first thin-film transistor layer TFTL1 may be disposed in the first non-display area NDA1. The lead lines of the first thin-film transistor layer TFTL1 may be disposed in the first sub-area SBA.

A first light emitting element layer EML1 may be disposed on the first thin-film transistor layer TFT1. The first light emitting element layer EML1 may include a plurality of light emitting elements, each including a first electrode, a light emitting layer, and a second electrode sequentially stacked to emit light. The light emitting elements of the first light emitting element layer EML1 may each include a pixel defining layer defining the pixels. The light emitting elements of the first light emitting element layer EML1 may be disposed on the organic light emitting display surface DA1.

A first encapsulation layer TFEL1 may cover upper and side surfaces of the first light emitting element layer EML1 and may protect the first light emitting element layer EML1. The first encapsulation layer TFEL1 may include at least one inorganic layer and at least one organic layer which encapsulate the first light emitting element layer EML1.

Figure 7:
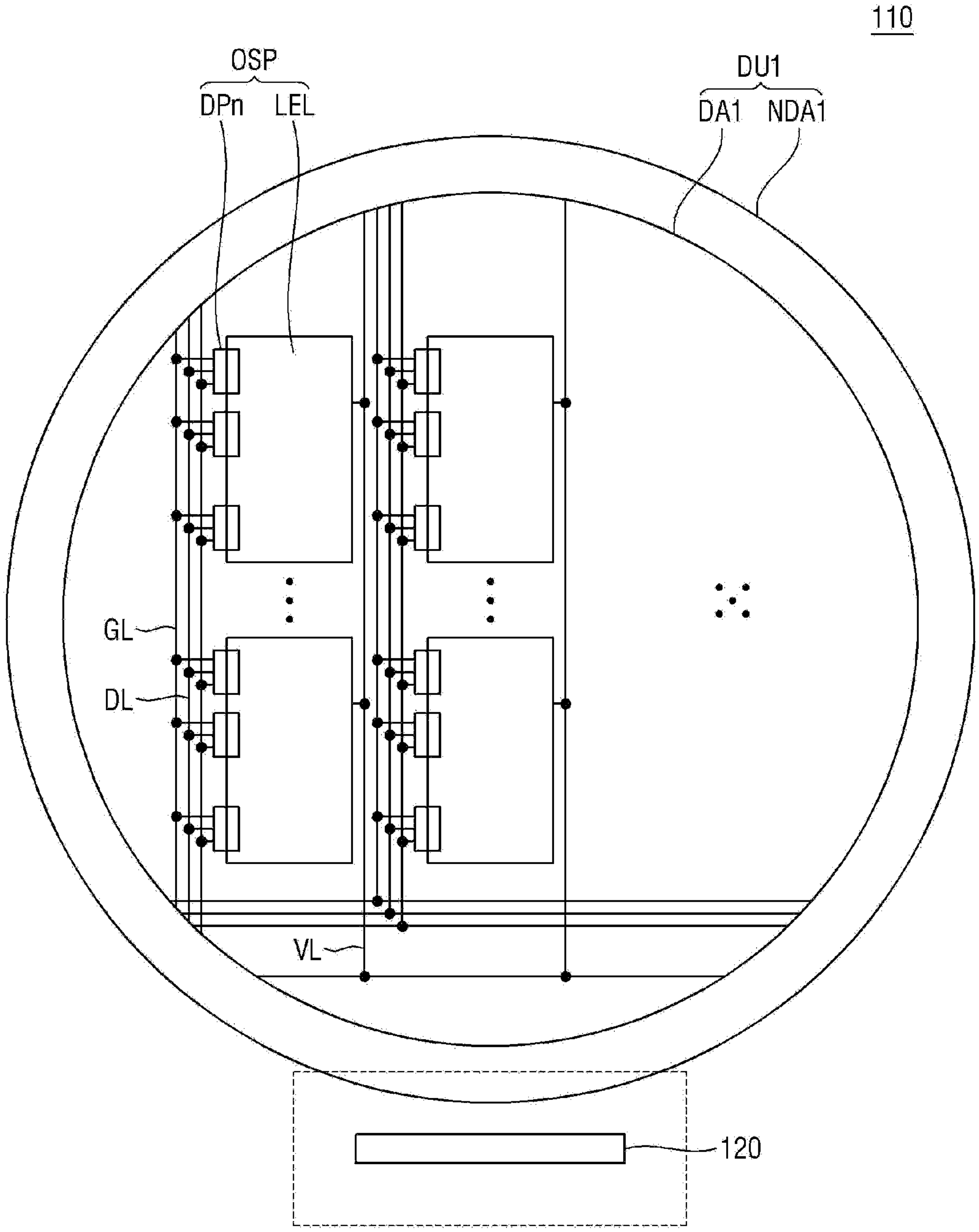
FIG. 7 is a plan view schematically illustrating the structure of an organic light emitting display surface of the surface light source device illustrated in FIGS. 5 and 6.

FIG. 7 is a plan view schematically illustrating the structure of the organic light emitting display surface DA1 of the surface light source device 110 illustrated in FIGS. 5 and 6. It is to be understood that aspects of the surface light source device 110 described in FIG. 7 may be similarly applied to the surface light source device 110 of FIG. 3.

Referring to FIG. 7, the organic light emitting display surface DA1 of the surface light emitting unit DU1 is an area of the surface light emitting unit DU1 that displays background light through surface light emission and may be defined as a central area of the surface light emitting unit DU1. The organic light emitting display surface DA1 may include a plurality of light emitting pixels OSP, gate lines GL, data lines DL, and power lines VL. Each of the light emitting pixels OSP may be defined as a minimum unit (or base unit) that emits light.

The gate lines GL may simultaneously supply gate signals received from the first gate driver 111 to the light emitting pixels OSP. That is, for example, the first gate driver 111 may provide the gate signals to the light emitting pixels OSP, via the gate lines GL. The gate lines GL may extend in X-axis and Y-axis directions according to the arrangement direction and planar shape of the light emitting pixels OSP and may be disposed in the X-axis or Y-axis direction around the light emitting pixels OSP. For example, the gate lines GL may extend in the X-axis and Y-axis directions and surround the light emitting pixels OSP.

The data lines DL may supply image data voltages received from the emission driving circuit 120 to the light emitting pixels OSP. The data lines DL may extend in the X-axis and Y-axis directions according to the arrangement direction and planar shape of the light emitting pixels OSP and may be disposed in the X-axis or Y-axis direction around the light emitting pixels OSP. For example, the data lines DL may extend in the X-axis and Y-axis directions and surround the light emitting pixels OSP.

The power lines VL may supply each power supply voltage received from the emission driving circuit 120 to the light emitting pixels OSP. In one or more embodiments, the power supply voltages may be at least one of a high-potential driving voltage, a low-potential ground voltage, and a reference voltage. The power lines VL may extend in the X-axis and Y-axis directions according to the arrangement direction and planar shape of the light emitting pixels OSP and may be disposed in the X-axis or Y-axis direction around the light emitting pixels OSP. For example, the power lines VL may extend in the X-axis and Y-axis directions and surround the light emitting pixels OSP.

The first non-display area NDA1 may include the first gate driver 111, fan-out lines FOL, and gate control lines GCL. The first gate driver 111 may generate gate signals based on a gate control signal in units of at least one frame period and may simultaneously supply the gate signals to the gate lines GL in units of at least one frame period. For example, a gate control signal and a corresponding gate control signal may each correspond to a unit of one frame period or a unit of multiple frame periods.

The fan-out lines FOL may extend from the emission driving circuit 120 to the organic light emitting display surface DA1. The fan-out lines FOL may simultaneously supply data voltages received from the emission driving circuit 120 to the data lines DL in units of at least one frame period. For example, the data voltages may correspond to a unit of one frame period or a unit of multiple frame periods The first gate control lines GCL1 may extend from the emission driving circuit 120 to the first gate driver 111. The first gate control lines GCL1 may supply gate control signals received from the emission driving circuit 120 to the first gate driver 111. That is, for example, the emission driving circuit 120 of the display device 200 may supply the gate control signals to the first gate driver 111, via the first gate control lines GCL1.

The emission driving circuit 120 supplies gate control signals to the first gate driver 111 through the gate control lines GCL. Accordingly, for example, the first gate driver 111 may supply control signals such as, for example, a scan control signal for simultaneously driving the light emitting pixels OSP to the light emitting pixels OSP. Here, for example, the emission driving circuit 120 may output analog image signals for simultaneously driving the light emitting pixels OSP to the fan-out lines FOL. The emission driving circuit 120 may simultaneously supply the analog image signals to the data lines DL through the fan-out lines FOL. The analog image signals may be supplied to the light emitting pixels OSP and may determine luminances of the light emitting pixels OSP. That is, for example, the emission driving circuit 120 of the display device 200 may supply the analog image signals simultaneously to the light emitting pixels OSP (and sub-light emitting pixels OSP1 through OSP3 later described at least with reference to FIG. 10), via the data lines DL and the fan-out lines FOL.

Figure 8:
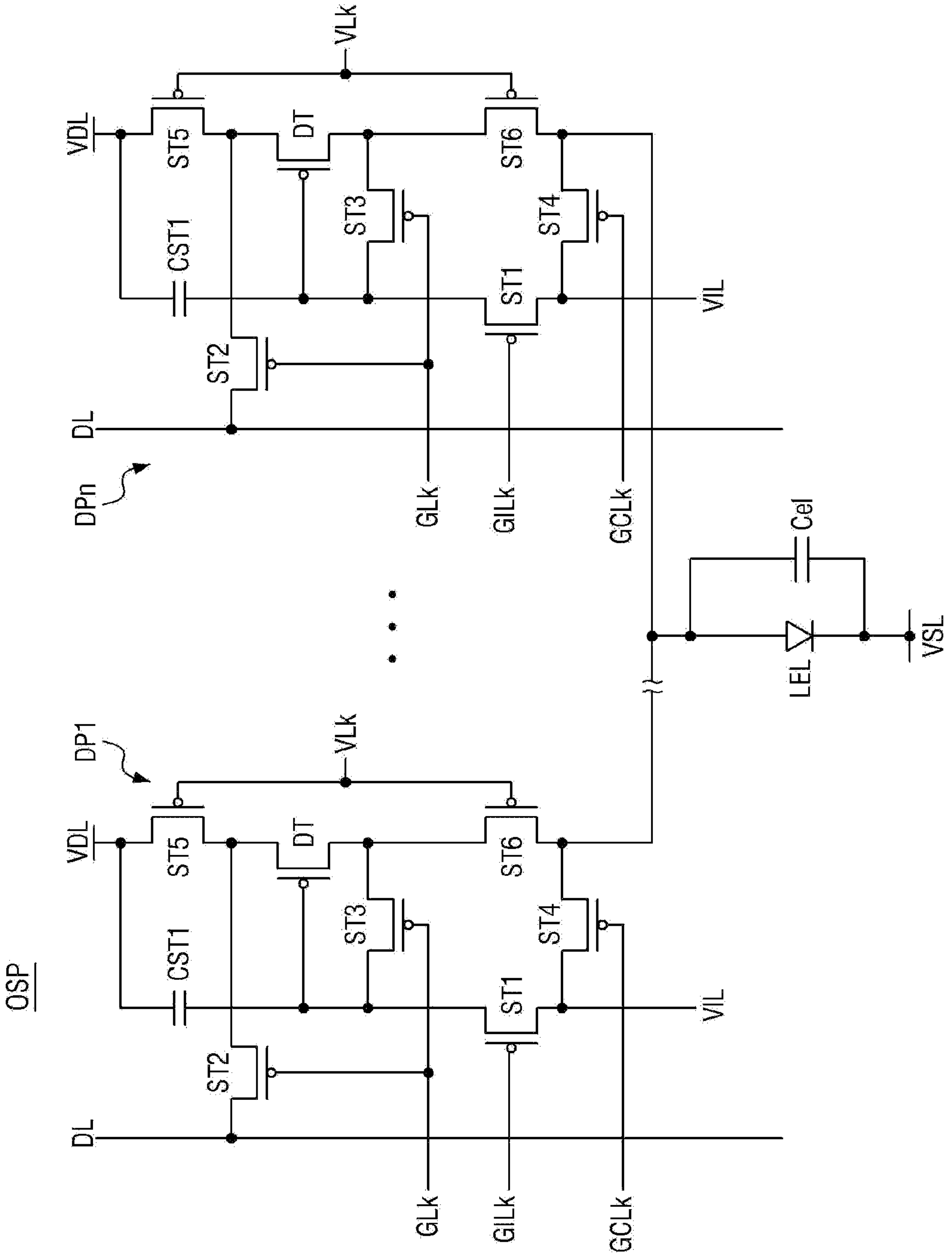
FIG. 8 is a circuit diagram illustrating the circuit structure of a light emitting pixel according to an embodiment of the present disclosure.

FIG. 8 is a circuit diagram illustrating the circuit structure of a light emitting pixel OSP according to an embodiment of the present disclosure.

Referring to FIG. 8 together with FIG. 7, each of the light emitting pixels OSP arranged on the organic light emitting display surface DA1 may include a plurality of pixel drivers DP1 through DPn and a light emitting element LEL.

The light emitting element LEL is connected in parallel to the pixel drivers DP1 through DPn and emits light in response to driving currents simultaneously input from the pixel drivers DP1 through DPn. In the example of FIG. 8, the pixel drivers DP1 through DPn are connected in parallel, and the parallel connected pixel drivers DP1 through DPn are connected in series to the light emitting element LEL.

The pixel drivers DP1 through DPn may receive the same control signals and analog image signal through the first gate driver 111 and the emission driving circuit 120 and drive the light emitting element LEL connected in parallel to the pixel drivers DP1 through DPn at the same driving timing in units of at least one frame. For example, the first gate driver 111 may provide the same control signal (or control signals) to pixel driver DP1 through pixel driver DPn, and the emission driving circuit 120 may provide the same analog image signal to pixel driver DP1 through pixel driver DPn.

In an example embodiment, the light emitting pixels OSP are disposed at ultra-low resolution. For example, the light emitting pixels OSP may be formed and disposed on the organic light emitting display surface DA1 in units of at least three light emitting pixels OSP. In other words, the light emitting pixels OSP may be formed and disposed on the organic light emitting display surface DA1 in units of at least three light emitting pixels OSP. For example, the number of light emitting pixels OSP disposed on the organic light emitting display surface DA1 may be a multiple of 3 (e.g., 3, 6, 9, 12, 15, and the like).

The planar area of the light emitting element LEL of each light emitting pixel OSP is inversely proportional to the resolution value. That is, for example, the planar area of each light emitting element LEL may be inversely proportional to the resolution at which the light emitting elements LEL are disposed. Since a resistance-capacitance (RC) value of each light emitting element LEL increases as the planar area of each light emitting element LEL increases, a plurality of pixel drivers DP1 through DPn are connected to each light emitting element LEL to prevent a reduction in the amount of light emitted from each light emitting element LEL. In an example, the pixel drivers DP1 through DPn of each light emitting pixel OSP may receive control signals and an analog image signal at the same timing and drive the light emitting element LEL at the same driving timing.

Referring to FIG. 8, each of the pixel drivers DP1 through DPn of each light emitting pixel OSP may be connected to a $k^{th}$ display initialization line GILk, a $k^{th}$ display scan line GLk, a $k^{th}$ display control line GCLk, and a $k^{th}$ emission control line VLk.

In some aspects, each of the pixel drivers DP1 through DPn may be connected to a first driving voltage line VDL to which a high-potential first driving voltage is supplied, a second driving voltage line VSL to which a low-potential second driving voltage is supplied, and a third driving voltage line VIL to which a high-potential third driving voltage is supplied. The letters k and n used instead of numbers will hereinafter be defined as positive integers excluding zero.

Each of the pixel drivers DP1 through DPn of each light emitting pixel OSP may include a driving transistor DT, switch elements, and a capacitor CST1. The switch elements include first through sixth transistors ST1 through ST6.

The driving transistor DT of each of the pixel drivers DP1 through DPn may include a gate electrode, a first electrode, and a second electrode. The driving transistor DT may control a drain-source current Ids (hereinafter, referred to as a "driving current") flowing between the first electrode and the second electrode according to a data voltage applied to the gate electrode. The driving current Ids flowing through a channel of the driving transistor DT is proportional to the square of a difference between a voltage Vgs between the first electrode and the gate electrode of the driving transistor DT and a threshold voltage as shown in Equation 1.

$$Ids = k' \times (Vsg - Vth)^2 \quad (1)$$

In Equation 1, k' is a proportional coefficient determined by the structure and physical characteristics of a driving transistor, Vsg is a voltage between the first electrode and the gate electrode of the driving transistor, and Vth is a threshold voltage of the driving transistor.

The light emitting element LEL emits light according to the driving currents Ids simultaneously supplied through the pixel drivers DP1 through DPn. As the driving currents Ids supplied in parallel from the pixel drivers DP1 through DPn increase, the amount of light emitted from the light emitting element LEL may increase.

The light emitting element LEL may be an organic light emitting diode including an organic light emitting layer disposed between an anode and a cathode. Alternatively, the light emitting element LEL may be an inorganic light emitting element including an inorganic semiconductor disposed between the anode and the cathode. Alternatively, the light emitting element LEL may be a quantum dot light emitting element including a quantum dot light emitting layer disposed between the anode and the cathode.

Alternatively, the light emitting element LEL may be a micro-light emitting element including a micro-light emitting diode disposed between the anode and the cathode. In one or more embodiments, the display device 200 may include light emitting elements LEL of the same type (e.g., organic light emitting diodes, inorganic light emitting elements, or the like described herein) or of different types.

The anode of each light emitting element LEL may be connected to a first electrode of the fourth transistor ST4 and a second electrode of the sixth transistor ST6 of each of the pixel drivers DP1 through DPn, and the cathode may be connected to the second driving voltage line VSL. A parasitic capacitance Cel may be formed between the anode and the cathode of the light emitting element LEL.

The first transistor ST1 may be turned on by an initialization scan signal of the $k^{th}$ display initialization line GILk, and in the ON state, the first transistor ST1 connects the gate electrode of the driving transistor DT to the third driving voltage line VIL. Accordingly, for example, the third driving voltage VINT of the third driving voltage line VIL may be applied to the gate electrode of the driving transistor DT. The first transistor ST1 may have a gate electrode connected to the $k^{th}$ display initialization line GILk, a first electrode connected to the gate electrode of the driving transistor DT, and a second electrode connected to the third driving voltage line VIL.

The second transistor ST2 is turned on by a display scan signal of the $k^{th}$ display scan line GLk, and in the ON state, the second transistor ST2 connects the first electrode of the driving transistor DT to a data line DL. Accordingly, for example, a data voltage of the data line DL may be applied to the first electrode of the driving transistor DT. The second transistor ST2 may have a gate electrode connected to the $k^{th}$ display scan line GLk, a first electrode connected to the first electrode of the driving transistor DT, and a second electrode connected to the data line DL.

The third transistor ST3 is turned on by the display scan signal of the $k^{th}$ display scan line GLk, and in the ON state, the third transistor ST3 connects the gate electrode and the second electrode of the driving transistor DT. When the gate electrode and the second electrode of the driving transistor DT are connected, the driving transistor DT operates as a diode. The third transistor ST3 may have a gate electrode connected to the $k^{th}$ display scan line GLk, a first electrode connected to the second electrode of the driving transistor DT, and a second electrode connected to the gate electrode of the driving transistor DT.

The fourth transistor ST4 is turned on by a display control signal of the $k^{th}$ display control line GCLk, and in the ON state, the fourth transistor ST4 connects the anode of the light emitting element LEL to the third driving voltage line VIL. The third driving voltage of the third driving voltage line VIL may be applied to the anode of the light emitting element LEL. The fourth transistor ST4 may have a gate electrode connected to the $k^{th}$ display control line GCLk, the first electrode connected to the anode of the light emitting element LEL, and a second electrode connected to the third driving voltage line VIL.

The fifth transistor ST5 is turned on by an emission signal of the $k^{th}$ emission control line VLK, and in the ON state, the fifth transistor ST5 connects the first electrode of the driving transistor DT to the first driving voltage line VDL. The fifth transistor ST5 may have a gate electrode connected to the $k^{th}$ emission control line VLk, a first electrode connected to the first driving voltage line VDL, and a second electrode connected to the first electrode of the driving transistor DT.

The sixth transistor ST6 is disposed between the second electrode of the driving transistor DT and the anode of the light emitting element LEL. The sixth transistor ST6 is turned on by the emission control signal of the $k^{th}$ emission control line VLk, and in the ON state, the sixth transistor ST6 connects the second electrode of the driving transistor DT to the anode of the light emitting element LEL. The sixth transistor ST6 may have a gate electrode connected to the $k^{th}$ emission control line VLk, a first electrode connected to the second electrode of the driving transistor DT, and the second electrode connected to the anode of the light emitting element LEL.

When both the fifth transistor ST5 and the sixth transistor ST6 are turned on, the driving current Ids of the driving transistor DT according to the data voltage applied to the gate electrode of the driving transistor DT may flow to the light emitting element LEL.

The capacitor CST1 is formed between the gate electrode of the driving transistor DT and the first driving voltage line VDL. A first capacitor electrode of the capacitor CST1 may be connected to the gate electrode of the driving transistor DT, and a second capacitor electrode may be connected to the first driving voltage line VDL.

In an example, the first electrode of each of the first through sixth transistors ST1 through ST6 and the driving transistor DT is a source electrode, and the second electrode is a drain electrode. Alternatively, in another example, the first electrode of each of the first through sixth transistors ST1 through ST6 and the driving transistor DT is a drain electrode, and the second electrode is a source electrode.

An active layer of each of the first through sixth transistors ST1 through ST6 and the driving transistor DT may be formed of any one of polysilicon, amorphous silicon, and an oxide semiconductor. Although a case where the first through sixth transistors ST1 through ST6 and the driving transistor DT are formed as P-type metal oxide semiconductor field effect transistors (MOSFETs) is described in FIG. 8, embodiments are not limited thereto. For example, the first through sixth transistors ST1 through ST6 and the driving transistor DT may also be formed as N-type MOS- FETs. Alternatively, in an example, at least one of the first through sixth transistors ST1 through ST6 may be formed as an N-type MOSFET.

Figure 9:
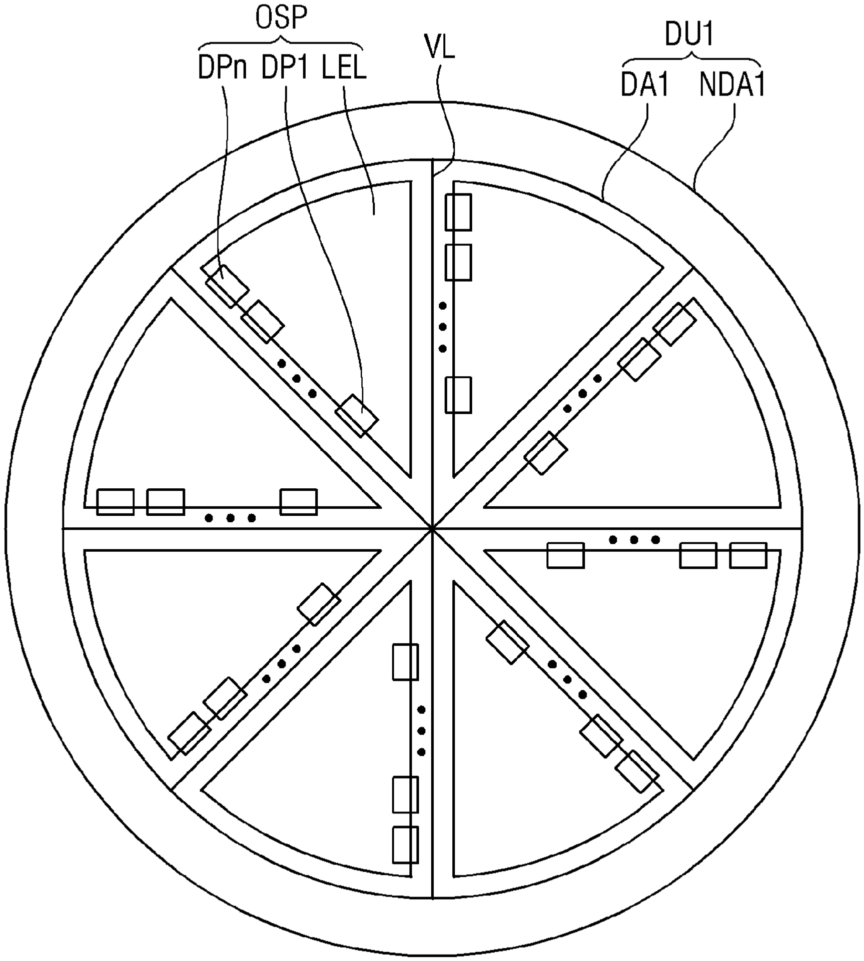
FIG. 9 is a plan view illustrating an arrangement structure of light emitting pixels of a surface light emitting unit illustrated in FIG. 7 according to a first embodiment.
Figure 10:
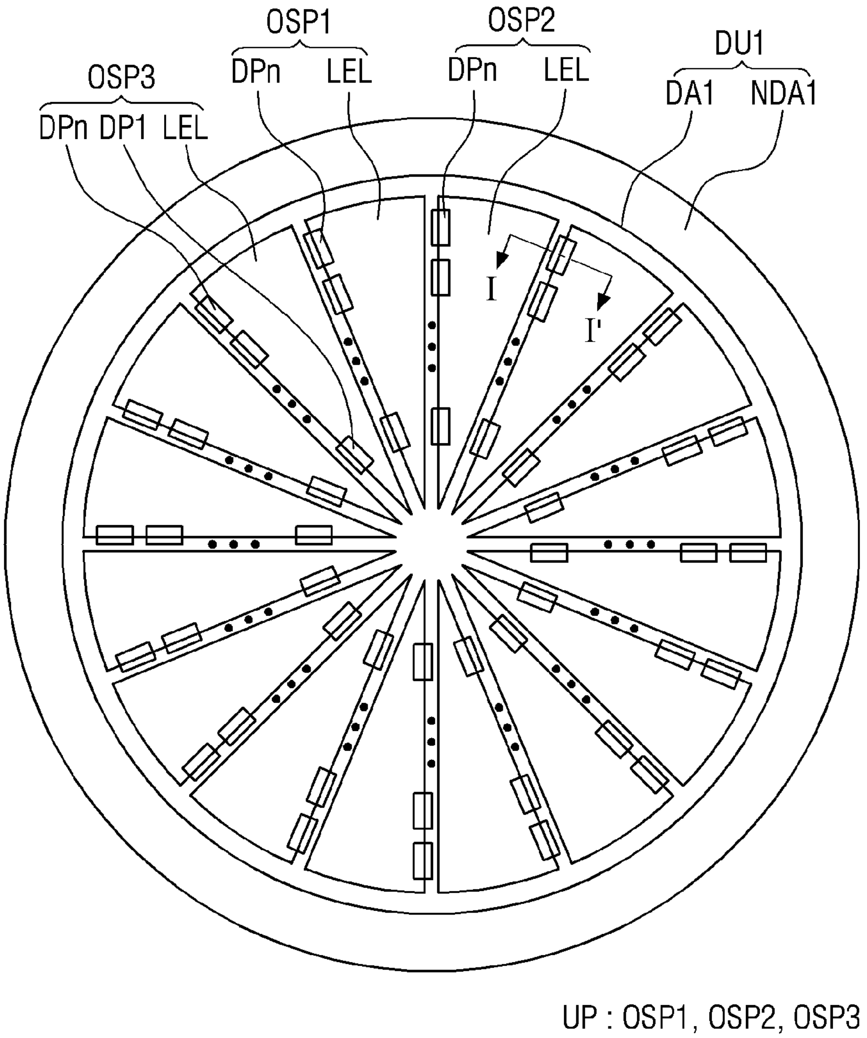
FIG. 10 is a plan view illustrating an arrangement structure of the light emitting pixels of the surface light emitting unit illustrated in FIG. 7 according to a second embodiment.

FIG. 9 is a plan view illustrating an arrangement structure of the light emitting pixels OSP of the surface light emitting unit DU1 illustrated in FIG. 7 according to a first embodiment. FIG. 10 is a plan view illustrating an arrangement structure of the light emitting pixels OSP of the surface light emitting unit DU1 illustrated in FIG. 7 according to a second embodiment.

Referring to FIGS. 9 and 10, the organic light emitting display surface DA1 may be formed in a circular shape in a plan view according to the planar shape of the surface light source device 110. Light emitted from the light emitting element LEL of each light emitting pixel OSP may be displayed as background light on the organic light emitting display surface DA1. The light emitting element LEL of each light emitting pixel OSP emits light in response to driving currents supplied in parallel from a plurality of pixel drivers DP1 through DPn.

In one or more embodiments, the light emitting pixels OSP may be formed and disposed on the organic light emitting display surface DA1 in units of at least three. Accordingly, for example, the number of light emitting elements LEL disposed on the organic light emitting display surface DA1 may be a multiple of 3 (e.g., 3, 6, 9, 12, 15, 18 . . . ).

On the organic light emitting display surface DA1 formed in a circular shape in a plan view, the light emitting elements LEL may be formed in at least any one of a sector shape, a triangular shape, a rhombus shape, a circular shape, a semicircular shape, and an elliptical shape in a plan view or may be formed in a combination of the plurality of shapes. For example, one or more light emitting elements LEL may be formed of a combination of a first shape (e.g., a sector shape) and at least one other shape (e.g., triangular shape, rhombus shape, or the like).

Referring to FIGS. 9 and 10, the light emitting elements LEL formed in a sector shape may be disposed in a circular shape in a plan view such that the light emitting elements LEL surround a center (or center point) of the organic light emitting display surface DA1 in a circular shape. The planar area of each light emitting element LEL is inversely proportional to the resolution value. That is, for example, as illustrated in FIG. 9, the planar area of each light emitting element LEL may be larger as the number of light emitting elements LEL is smaller and the resolution is lower. Conversely, for example, as illustrated in FIG. 10, the planar area of each light emitting element LEL may be smaller as the number of light emitting elements LEL is larger and the resolution is higher.

The power lines VL, (e.g., the first through third driving voltage lines VDL, VSL and VIL) supplying power voltages to the pixel drivers DP1 through DPn and the light emitting elements LEL may be disposed and formed between and around the light emitting elements LEL.

As described herein, since the RC value of each light emitting element LEL increases as the planar area of each light emitting element LEL increases, a plurality of pixel drivers DP1 through DPn are connected to each light emitting element LEL, which prevents a reduction in the amount of light emitted from each light emitting element LEL. The pixel drivers DP1 through DPn of each light emitting pixel OSP may be formed and disposed along at least any one side surface of a light emitting element LEL to partially overlap the light emitting element LEL. The pixel drivers DP1 through DPn of each light emitting pixel OSP may receive scan control signals and an analog image signal at the same timing and drive the light emitting element LEL at the same driving timing.

Referring to FIG. 10, the first through third sub-light emitting pixels OSP1 through OSP3 capable of respectively displaying red light, green light, and blue light may constitute each unit light emitting pixel UP capable of emitting white light, and the unit light emitting pixels UP may be alternately and repeatedly disposed on the organic light emitting display surface DA1. The unit light emitting pixels UP may be disposed in a circular shape in a plan view such that the unit light emitting pixels UP surround the center (or center point) of the organic light emitting display surface DA1 in a circular shape.

Figure 11:
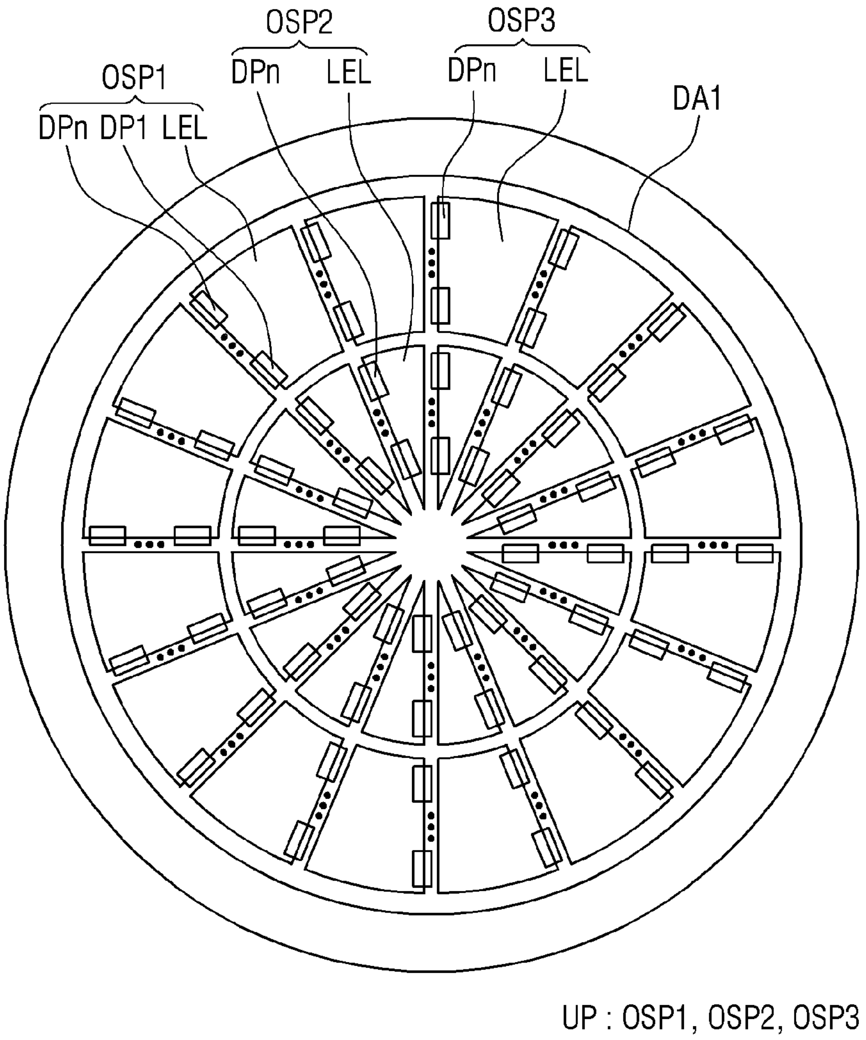
FIG. 11 is a plan view illustrating an arrangement structure of the light emitting pixels of the surface light emitting unit illustrated in FIG. 7 according to a third embodiment.

FIG. 11 is a plan view of illustrating an arrangement structure of the sub-light emitting pixels OSP of the surface light emitting unit DU1 illustrated in FIG. 7 according to a third embodiment.

Referring to FIG. 11, a combination of the first through third sub-light emitting pixels OSP1 through OSP3 formed in a sector shape, a triangular shape, and a rhombus shape in a plan view may be disposed on the organic light emitting display surface DA1 formed in a circular shape in a plan view. In the example of FIG. 11, first sub-light emitting pixel OSP1 is a sector shape, second sub-light emitting pixel OSP2 is a sector shape, and third sub-light emitting pixel OSP3 is a triangular shape.

For example, the first through third sub-light emitting pixels OSP1 through OSP3 formed in a triangular shape and a rhombus shape, that is, the light emitting elements LEL of the first through third sub-light emitting pixels OSP1 through OSP3 may be disposed in a circular shape in a plan view such that the light emitting elements LEL surround the center of the organic light emitting display surface DA1 in a circular shape. Here, for example, the planar area of each light emitting element LEL may be larger as the number of light emitting elements LEL disposed is smaller and the resolution is lower.

Conversely, the planar area of each light emitting element LEL may be smaller as the number of light emitting elements LEL disposed is larger and the resolution is higher. In one or more embodiments, the light emitting elements LEL of the first through third sub-light emitting pixels OSP1 through OSP3 may have the same planar area. For example, the light emitting elements LEL are formed such that respective planar areas of the light emitting elements LEL among the first sub-light emitting pixels OSP1 are the same (e.g., in shape and/or total area), respective planar areas of the light emitting elements LEL among the second sub-light emitting pixels OSP2 are the same, and respective planar areas of the light emitting elements LEL among the third sub-light emitting pixels OSP3 are the same. In some other embodiments, the light emitting elements LEL may be formed such that respective planar areas of light emitting elements LEL are different.

A plurality of pixel drivers DP1 through DPn are connected to each of the light emitting elements LEL formed in a sector shape, a triangular shape, and a rhombus shape. The pixel drivers DP1 through DPn of each of the first through third sub-light emitting pixels OSP1 through OSP3 may be formed and disposed along at least any one side surface of a light emitting element LEL to partially overlap the light emitting element LEL. The pixel drivers DP1 through DPn of each of the first through third sub-light emitting pixels OSP1 through OSP3 receive control signals and a data voltage at the same timing and drive the light emitting element LEL at the same driving timing.

As described herein, the first through third sub-light emitting pixels OSP1 through OSP3 capable of respectively displaying red light, green light, and blue light may constitute each unit light emitting pixel UP, and the unit light emitting pixels UP may be alternately and repeatedly disposed on the organic light emitting display surface DA1. The unit light emitting pixels UP may be disposed in a circular shape in a plan view such that the unit light emitting pixels UP surround the center of the organic light emitting display surface DA1 in a circular shape.

Figure 12:
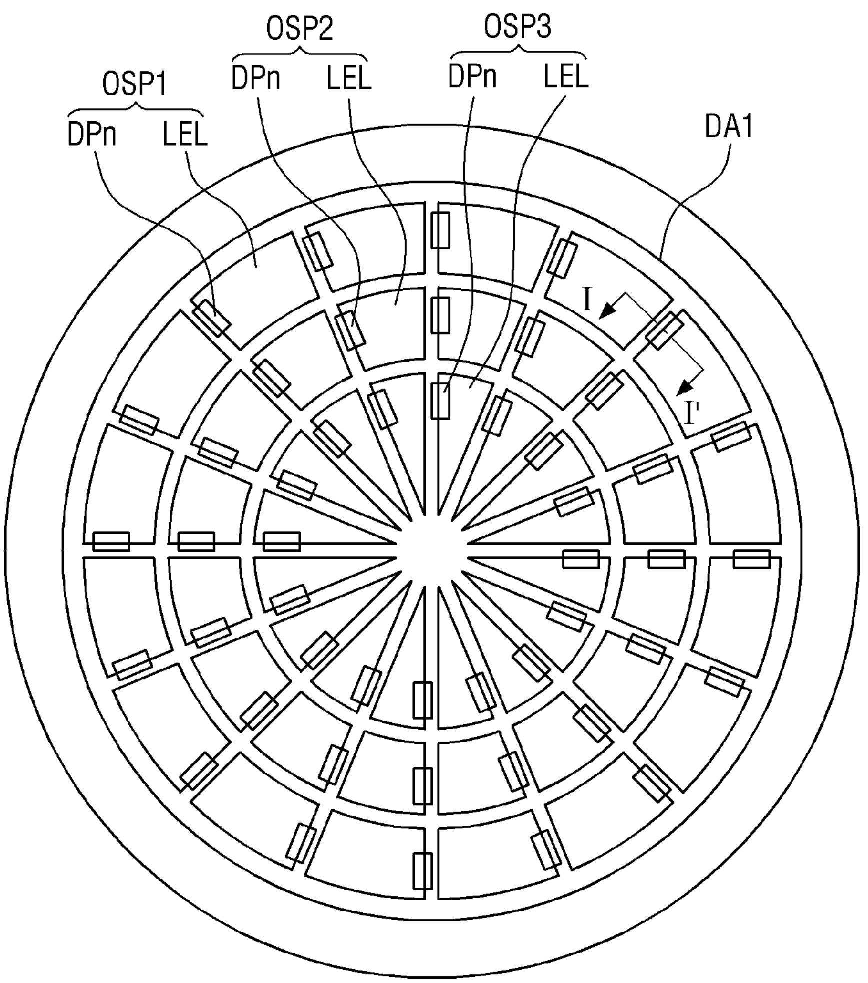
FIG. 12 is a plan view illustrating an arrangement structure of the light emitting pixels of the surface light emitting unit illustrated in FIG. 7 according to a fourth embodiment.

FIG. 12 is a plan view illustrating an arrangement structure of the sub-light emitting pixels OSP of the surface light emitting unit DU1 illustrated in FIG. 7 according to a fourth embodiment.

Referring to FIG. 12, a light emitting element LEL included in any one of the first through third sub-light emitting pixels OSP1 through OSP3 may be formed in a triangular shape. In addition, light emitting elements LEL included in the other two of the first through third sub-light emitting pixels OSP1 through OSP3 may be formed in a rhombus shape. Therefore, for example, each unit light emitting pixel UP composed of a combination of the first through third sub-light emitting pixels OSP1 through OSP3 may be formed and disposed in a sector shape. In the example of FIG. 12, first sub-light emitting pixel OSP1 is a rhombus shape, second sub-light emitting pixel OSP2 is a rhombus shape, and third sub-light emitting pixel OSP3 is a triangular shape.

The unit light emitting pixels UP formed in a sector shape, that is, the light emitting elements LEL included in the first through third sub-light emitting pixels OSP1 through OSP3 of the unit light emitting pixels UP may be disposed in a circular shape in a plan view such that the unit light emitting pixels UP (and included light emitting elements LEL) surround the center of the organic light emitting display surface DA1 in a circular shape. Here, for example, the light emitting elements LEL of the first through third sub-light emitting pixels OSP1 through OSP3 of the unit light emitting pixels UP may all have the same planar area. For example, the light emitting elements LEL are formed such that respective planar areas of the light emitting elements LEL among the first sub-light emitting pixels OSP1 are the same (e.g., in shape and/or total area), respective planar areas of the light emitting elements LEL among the second sub-light emitting pixels OSP2 are the same, and respective planar areas of the light emitting elements LEL among the third sub-light emitting pixels OSP3 are the same.

At least one pixel driver DP1 through DPn may be connected to the light emitting element LEL of each of the first through third sub-light emitting pixels OSP1 through OSP3. For example, a pixel driver may be connected to a respective light emitting element LEL, for at least one of the first sub-light emitting pixels OSP1, at least one of the second sub-light emitting pixels OSP2, and/or at least one of the third sub-light emitting pixels OSP3. The unit light emitting pixels UP may receive control signals and a data voltage at the same timing and drive the light emitting element LEL at the same driving timing.

Figure 13:
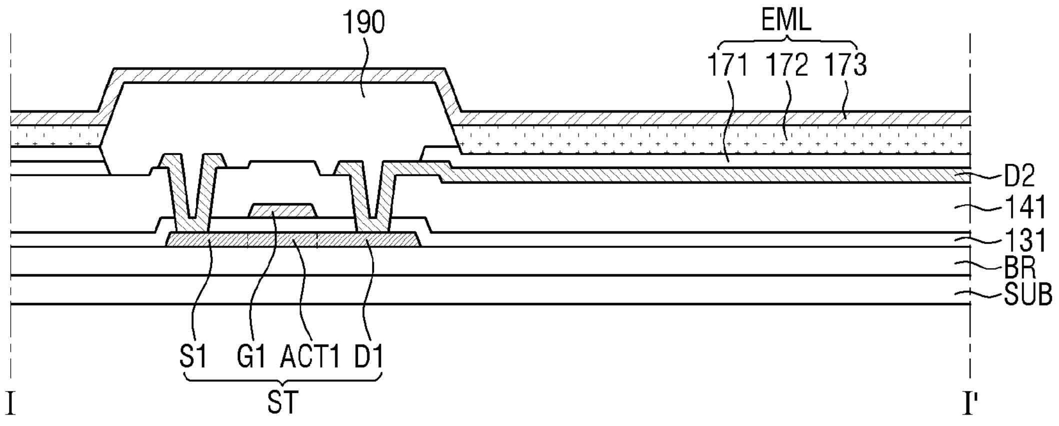
FIG. 13 is a cross-sectional view of a first embodiment illustrating the cross-sectional structure of a plane cut along line I-I' of FIGS. 10 and 12.

FIG. 13 is a cross-sectional view illustrating the cross-sectional structure of a plane cut along line I-I' of FIGS. 10 and 12 according to a first embodiment.

As described herein, since the RC value of each light emitting element LEL increases as the planar area of each light emitting element LEL increases, a plurality of pixel drivers DP1 through DPn are connected to each light emitting element LEL, which prevents a reduction in the amount of light emitted from each light emitting element LEL. The pixel drivers DP1 through DPn of each light emitting pixel OSP may be formed and disposed along at least any one side surface of a light emitting element LEL such that the pixel drivers DP1 through DPn partially overlap the light emitting element LEL in the Z-axis direction which is the thickness direction.

In addition, in some aspects, since the RC value of each light emitting element LEL increases as the planar area of each light emitting element LEL increases, the present disclosure supports applying a structure that reduces the RC value of each light emitting element LEL in order to prevent a reduction in the amount of light emitted from each light emitting element LEL.

Specifically, for example, the light emitting element LEL of each sub-light emitting pixel OSP is formed in a structure in which a first planar electrode D2, a first light emitting electrode 171, an organic light emitting layer 172, and a common electrode 173 are stacked. The first planar electrode D2 extends from a drain terminal formed in at least any one transistor ST such as, for example, the sixth transistor ST6 and is formed in a plane in an emission area.

Referring to FIG. 13 together with FIG. 12, the first planar electrode D2 extends from the drain terminal formed in at least any one transistor ST of each of the pixel drivers DP1 through DPn and is disposed in a plane in an emission area where the light emitting element LEL is formed. In addition, for example, the first light emitting electrode 171 utilized as a pixel electrode is formed in the emission area such that the first light emitting electrode 171 covers the first planar electrode D2 and overlaps a portion of a front surface of the first planar electrode D2.

Aspects of the present disclosure support reducing or lowering the RC value of the first light emitting electrode 171 overlapping and contacting the first planar electrode D2 in a planar shape according to the thickness and planar area of the first planar electrode D2.

The organic light emitting layer 172 is formed and disposed on a front surface of the first light emitting electrode 171. In addition, for example, the common electrode 173 may be formed and disposed on the entire organic light emitting display surface DA1 such that the common electrode 173 covers all of the organic light emitting layers 172 of the light emitting elements LEL.

A method of forming any one thin-film transistor ST and a light emitting element LEL in each of the sub-light emitting pixels OSP1 through OSP3 in accordance with one or more embodiments of the present disclosure will now be described in detail with reference to FIGS. 12 and 13.

A barrier layer BR may be disposed on a first substrate SUB1. The first substrate SUB1 may be formed of an insulating material such as, for example, a polymer resin. For example, the first substrate SUB1 may be formed of polyimide. The first substrate SUB1 may be a flexible substrate that can be bent, folded, or rolled.

The barrier layer BR is a layer for protecting thin-film transistors ST of a thin-film transistor layer TFTL and the light emitting layer 172 of a light emitting element layer EML from moisture introduced through the first substrate SUB1 which is vulnerable to moisture penetration. The barrier layer BR may be composed of a plurality of inorganic layers stacked alternately. The light emitting element EML described with reference to FIGS. 13 to 15 includes aspects of light emitting element EML1 described with reference to FIG. 6.

The thin-film transistors ST of each of the pixel drivers DP1 through DPn may be formed and disposed on the barrier layer BR. Each of the thin-film transistors ST includes an active layer ACT1, a gate electrode G1, a source electrode S1, and a drain electrode D1.

For example, the active layers ACT1, the source electrodes S1, and the drain electrodes D1 of the thin-film transistors ST may be disposed on the barrier layer BR. The active layers ACT1 of the thin-film transistors ST may include polycrystalline silicon, monocrystalline silicon, low-temperature polycrystalline silicon, amorphous silicon, or an oxide semiconductor. The active layers ACT1 overlapped by the gate electrodes G1 in the thickness direction of the first substrate SUB1 may be defined as channel regions. In one or more embodiments, the source electrodes S1 and the drain electrodes D1 are regions not overlapped by the gate electrodes G1 and may be formed to have conductivity by doping a silicon semiconductor or an oxide semiconductor with ions or impurities.

A gate insulating layer 131 may be disposed on the active layers ACT1, the source electrodes S1, and the drain electrodes D1 of the thin-film transistors ST. The gate insulating layer 131 may be formed of an inorganic layer, for example, a silicon nitride layer, a silicon oxynitride layer, a silicon oxide layer, a titanium oxide layer, or an aluminum oxide layer.

The gate electrodes G1 of the thin-film transistors ST may be disposed on the gate insulating layer 131. The gate electrodes G1 may overlap the active layers ACT1 in the thickness direction. Each of the gate electrodes G1 may be a single layer or a multilayer formed of any one or more of molybdenum (Mo), aluminum (Al), chromium (Cr), gold (Au), titanium (Ti), nickel (Ni), neodymium (Nd), copper (Cu), and alloys thereof.

A first interlayer insulating layer 141 may be disposed on the gate electrodes G1 of the thin-film transistors ST. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may include a plurality of inorganic layers. For example, the first interlayer insulating layer 141 may include one or more instances of the inorganic layers described herein.

A plurality of contact holes are formed in the first interlayer insulating layer 141, and a source terminal and a drain terminal are formed in the contact holes of the first interlayer insulating layer 141 (also referred to herein as a first interlayer insulating film). Here, for example, the first planar electrode D2 is integrated with the drain terminal and formed in a plane in an emission area where the light emitting element LEL is formed. The first planar electrode D2 as well as the source terminal and the drain terminal may each be a single layer or a multilayer formed of any one or more of molybdenum (Mo), aluminum (Al), chromium (Cr), gold (Au), titanium (Ti), nickel (Ni), neodymium (Nd), copper (Cu), and alloys thereof.

The first light emitting electrode 171 utilized as a pixel electrode (or anode) of the light emitting element LEL is formed in the emission area including the first planar electrode D2. Here, for example, the first light emitting electrode 171 is formed in the emission area such that the electrode 171 covers the first planar electrode D2 and overlaps a portion of the front surface of the first planar electrode D2. The RC value of the first light emitting electrode 171 overlapping and contacting the first planar electrode D2 in a planar shape is reduced or lowered according to the thickness and planar area of the first planar electrode D2.

A pixel defining layer 190 may be formed on the first interlayer insulating layer 141 including the first light emitting electrodes 171 such that the pixel defining layer 190 separates the first light emitting electrodes 171.

Then, the organic light emitting layer 172 may be formed in each of the emission areas respectively including the first light emitting electrodes 171, and the common electrode 173 may be formed and disposed on the entire organic light emitting display surface DA1 such that the common electrode 173 covers all of the organic light emitting layers 172 of the light emitting elements LEL.

Figure 14:
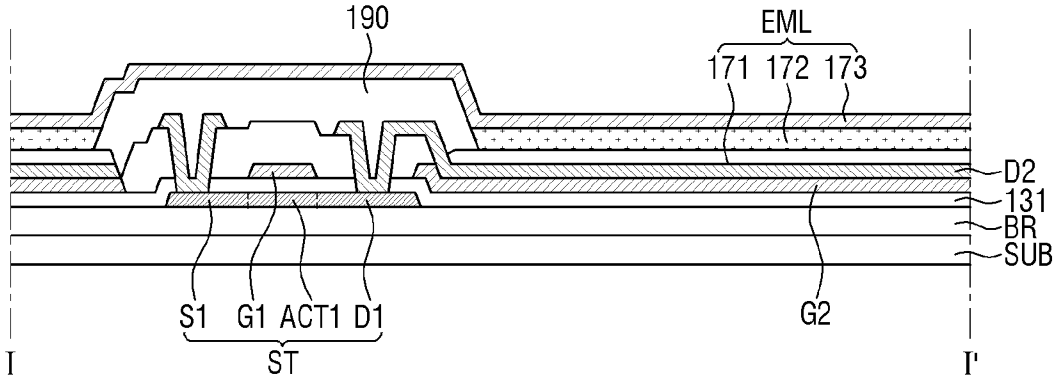
FIG. 14 is a cross-sectional view of a second embodiment illustrating the cross-sectional structure of the plane cut along line I-I' of FIGS. 10 and 12.

FIG. 14 is a cross-sectional view illustrating the cross-sectional structure of the plane cut along line I-I' of FIGS. 10 and 12 according to a second embodiment.

As described herein, since the RC value of each light emitting element LEL increases as the planar area of each light emitting element LEL increases, the present disclosure applies a structure that reduces the RC resistance of each light emitting element LEL, which prevents a reduction in the amount of light emitted from each light emitting element LEL.

Specifically, for example, the light emitting element LEL of each sub-light emitting pixel OSP is formed in a structure in which a floating gate electrode G2, a first planar electrode D2, a first light emitting electrode 171, an organic light emitting layer 172, and a common electrode 173 are stacked. The floating gate electrode G2 is formed through the same process as a gate electrode G1 formed in at least any one transistor ST such as, for example, the sixth transistor ST6. The floating gate electrode G2 is electrically separated from the gate electrode G1. The floating gate electrode G2 is disposed in a plane in an emission area where the light emitting element LEL is formed.

Referring to FIG. 14 together with FIG. 12, the floating gate electrode G2 is formed through the same process as the gate electrode G1 formed in at least any one transistor ST of each of the pixel drivers DP1 through DPn. The floating gate electrode G2 is electrically separated from the gate electrode G1 and is formed and disposed in a plane in the emission area where the light emitting element LEL is formed.

The first planar electrode D2 extends from a drain terminal formed in at least any one transistor ST and is formed in the emission area such that the first planar electrode D2 covers the floating gate electrode G2 and overlaps a portion of a front surface of the floating gate electrode G2.

In addition, the first light emitting electrode 171 utilized as a pixel electrode (or anode) is formed in the emission area such that the electrode 171 covers the first planar electrode D2 and overlaps a portion of a front surface of the first planar electrode D2.

Aspects of the present disclosure support reducing or lowering the RC value of the first light emitting electrode 171 overlapping and contacting the floating gate electrode G2 and the first planar electrode D2 in a planar shape according to the thicknesses and planar areas of the floating gate electrode G2 and the first planar electrode D2 electrically overlapping and connected to each other.

The organic light emitting layer 172 is formed and disposed on a front surface of the first light emitting electrode 171. In addition, for example, the common electrode 173 may be formed and disposed on the entire organic light emitting display surface DA1 such that the common electrode 173 covers all of the organic light emitting layers 172 of the light emitting elements LEL.

A method of forming any one thin-film transistor ST and a light emitting element LEL in each of the sub-light emitting pixels OSP1 through OSP3 in accordance with one or more embodiments of the present disclosure will now be described in detail with reference to FIGS. 12 and 14.

A gate insulating layer 131 may be disposed on an active layer ACT1, a source electrode S1 and a drain electrode D1 of each thin-film transistor ST, and a gate electrode G1 of each thin-film transistor ST and the floating gate electrode G2 may be simultaneously formed and disposed on the gate insulating layer 131. Here, for example, the gate electrode G1 is formed and disposed such that the gate electrode G1 overlaps the active layer ACT1 in the thickness direction, and the floating gate electrode G2 is electrically separated from the gate electrode G1 and formed and disposed in a plane in an emission area where the light emitting element LEL is formed.

Each of the gate electrode G1 and the floating gate electrode G2 may be a single layer or a multilayer formed of any one or more of molybdenum (Mo), aluminum (Al), chromium (Cr), gold (Au), titanium (Ti), nickel (Ni), neodymium (Nd), copper (Cu), and alloys thereof.

A first interlayer insulating layer 141 may be disposed on the gate electrodes G1 of the thin-film transistors ST.

A plurality of contact holes are formed in the first interlayer insulating layer 141, and a source terminal and a drain terminal are formed in the contact holes of the first interlayer insulating layer 141. Here, for example, the first planar electrode D2 is integrated with the drain terminal and formed in a plane in the emission area where the light emitting element LEL is formed. The first planar electrode D2 extends from the drain terminal formed in at least any one transistor ST and is formed in the emission area such that the first planar electrode D2 covers the floating gate electrode G2 and overlaps a portion of a front surface of the floating gate electrode G2.

The first light emitting electrode 171 utilized as a pixel electrode (or anode) of the light emitting element LEL is formed in the emission area including the first planar electrode D2. Here, for example, the first light emitting electrode 171 is formed in the emission area such that the electrode 171 covers the first planar electrode D2 and overlaps a portion of the front surface of the first planar electrode D2. The RC value of the first light emitting electrode 171 overlapping and contacting the floating gate electrode G2 and the first planar electrode D2 in a planar shape is reduced or lowered according to the thicknesses and planar areas of the floating gate electrode G2 and the first planar electrode D2.

A pixel defining layer 190 may be formed on the first interlayer insulating layer 141 including the first light emitting electrodes 171 such that the pixel defining layer 190 separates the first light emitting electrodes 171.

Then, the organic light emitting layer 172 may be formed in each of the emission areas respectively including the first light emitting electrodes 171, and the common electrode 173 may be formed and disposed on the entire organic light emitting display surface DA1 such that the common electrode 173 covers all of the organic light emitting layers 172 of the light emitting elements LEL.

Figure 15:
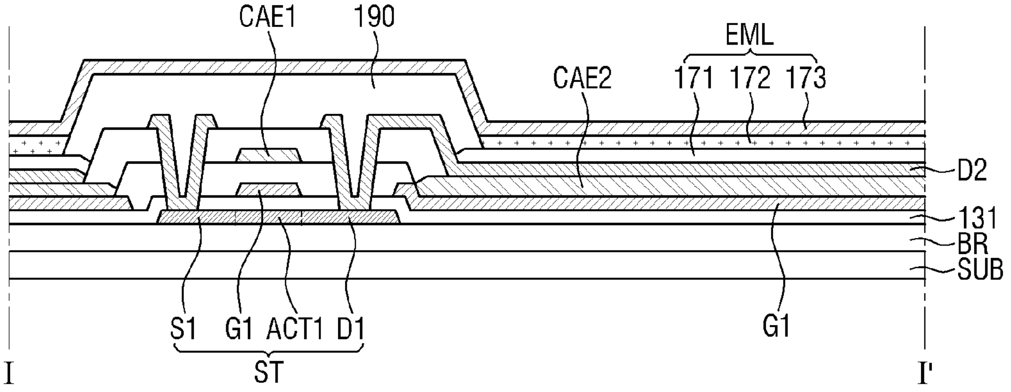
FIG. 15 is a cross-sectional view of a third embodiment illustrating the cross-sectional structure of the plane cut along line I-I' of FIGS. 10 and 12.

FIG. 15 is a cross-sectional view illustrating the cross-sectional structure of the plane cut along line I-I' of FIGS. 10 and 12 according to a third embodiment.

Referring to FIG. 15, a light emitting element LEL of each sub-light emitting pixel OSP is formed in a structure in which a floating gate electrode G2, a floating capacitor electrode CAE2, a first planar electrode D2, a first light emitting electrode 171, an organic light emitting layer 172, and a common electrode 173 are stacked. The floating capacitor electrode CAE2 is formed in an emission area such that the floating capacitor electrode CAE2 covers the floating gate electrode G2 and overlaps a portion of a front surface of the floating gate electrode G2.

Referring to FIGS. 12 and 15, the floating gate electrode G2 is formed through the same process as a gate electrode G1 formed in at least any one transistor of each of the pixel drivers DP1 through DPn. The floating gate electrode G2 is electrically separated from the gate electrode G1 and formed and disposed in a plane in the emission area where the light emitting element LEL is formed.

The floating capacitor electrode CAE2 is formed through the same process as a capacitor electrode CAE1 formed in at least any one transistor. The floating capacitor electrode CAE2 is electrically separated from the capacitor electrode CAE1 and formed and disposed in a plane in the emission area such that floating capacitor electrode CAE2 covers the floating gate electrode G2 and overlaps a portion of the front surface of the floating gate electrode G2.

The first planar electrode D2 extends from a drain terminal formed in at least any one transistor ST and is formed in a planar structure in the emission area such that the first planar electrode D2 covers the floating capacitor electrode CAE2 and overlaps a portion of a front surface of the floating capacitor electrode CAE2.

The first light emitting electrode 171 utilized as a pixel electrode (or anode) is formed in the emission area such that the electrode 171 covers the first planar electrode D2 and overlaps a portion of a front surface of the first planar electrode D2.

Aspects of the present disclosure support reducing or lowering the RC value of the first light emitting electrode 171 overlapping and contacting the floating capacitor electrode CAE2, the floating gate electrode G2 and the first planar electrode D2 in a planar shape according to the thicknesses and planar areas of the floating capacitor electrode CAE2, the floating gate electrode G2, and the first planar electrode D2 electrically overlapping and connected to each other.

The organic light emitting layer 172 is formed and disposed on a front surface of the first light emitting electrode 171. In addition, the common electrode 173 may be formed and disposed on the entire organic light emitting display surface DA1 such that the common electrode 173 covers all of the organic light emitting layers 172 of the light emitting elements LEL.

A method of forming any one thin-film transistor ST and a light emitting element LEL in each of the sub-light emitting pixels OSP1 through OSP3 in accordance with one or more embodiments of the present disclosure will now be described in detail with reference to FIGS. 12 and 15.

A first interlayer insulating layer 141 may be disposed on the gate electrodes G1 of thin-film transistors ST. Then, the first interlayer insulating layer 141 overlapping the floating gate electrode G2 may be etched and removed. Accordingly, the first interlayer insulating layer 141 may be disposed in areas where the thin-film transistors ST are formed, without disposing the first interlayer insulating layer 141 in areas where the thin-film transistors ST are not formed.

The capacitor electrode CAE1 is formed and disposed on the first interlayer insulating layer 141 such that the capacitor electrode CAE1 overlaps the gate electrode G1 of each thin-film transistor ST. At the same time, for example, the floating capacitor electrode CAE2 separated from the capacitor electrode CAE1 is formed and disposed on the floating gate electrode G2. The capacitor electrode CAE and the floating capacitor electrode CAE2 may be formed through the same patterning process.

Since the first interlayer insulating layer 141 has a predetermined dielectric constant, a capacitor may be formed by the capacitor electrode CAE, the gate electrode G1, and the first interlayer insulating layer 141 disposed between the capacitor electrode CAE and the gate electrode G1. Each of the capacitor electrode CAE and the floating capacitor electrode CAE2 may be a single layer or a multilayer formed of any one or more of molybdenum (Mo), aluminum (Al), chromium (Cr), gold (Au), titanium (Ti), nickel (Ni), neodymium (Nd), copper (Cu), and alloys thereof.

A second interlayer insulating layer 142 may be disposed on the capacitor electrode CAE. The second interlayer insulating layer 142 may be formed of an inorganic layer, for example, a silicon nitride layer, a silicon oxynitride layer, a silicon oxide layer, a titanium oxide layer, or an aluminum oxide layer.

A plurality of contact holes are formed in the first and second interlayer insulating layers 141 and 142. Here, for example, the second interlayer insulating layer 142 partially overlapping the floating capacitor electrode CAE2 may be etched and removed. Accordingly, the first and second interlayer insulating layers 141 and 142 may be disposed in the areas where the thin-film transistors ST are formed, without disposing the first interlayer insulating layer 141 and the second interlayer insulating layer 142 in areas where the thin-film transistors ST are not formed.

A source terminal and a drain terminal are formed in the contact holes of the first and second interlayer insulating layers 141 and 142. Here, for example, the first planar electrode D2 integrated with the drain terminal is formed in a plane in the emission area where the light emitting element LEL is formed. The first planar electrode D2 extends from the drain terminal formed in at least any one transistor ST and is formed in the emission area such that the first planar electrode D2 covers the floating capacitor electrode CAE2 and overlaps a portion of the front surface of the floating capacitor electrode CAE2.

The first light emitting electrode 171 utilized as a pixel electrode (or anode) of the light emitting element LEL is formed in the emission area including the first planar electrode D2. Here, for example, the first light emitting electrode 171 is formed in the emission area such that the electrode 171 covers the first planar electrode D2 and overlaps a portion of the front surface of the first planar electrode D2. Aspects of the present disclosure support reducing or lowering the RC value of the first light emitting electrode 171 overlapping and contacting the floating gate electrode G2, the floating capacitor electrode CAE2 and the first planar electrode D2 in a planar shape according to the thicknesses and planar areas of the floating gate electrode G2, the floating capacitor electrode CAE2, and the first planar electrode D2.

A pixel defining layer 190 may be formed on the first interlayer insulating layer 141 including the first light emitting electrodes 171 such that the pixel defining layer 190 separates the first light emitting electrodes 171.

Then, for example, the organic light emitting layer 172 may be formed in each of the emission areas respectively including the first light emitting electrodes 171, and the common electrode 173 may be formed and disposed on the entire organic light emitting display surface DA1 such that the common electrode 173 covers all of the organic light emitting layers 172 of the light emitting elements LEL.

Figure 16:
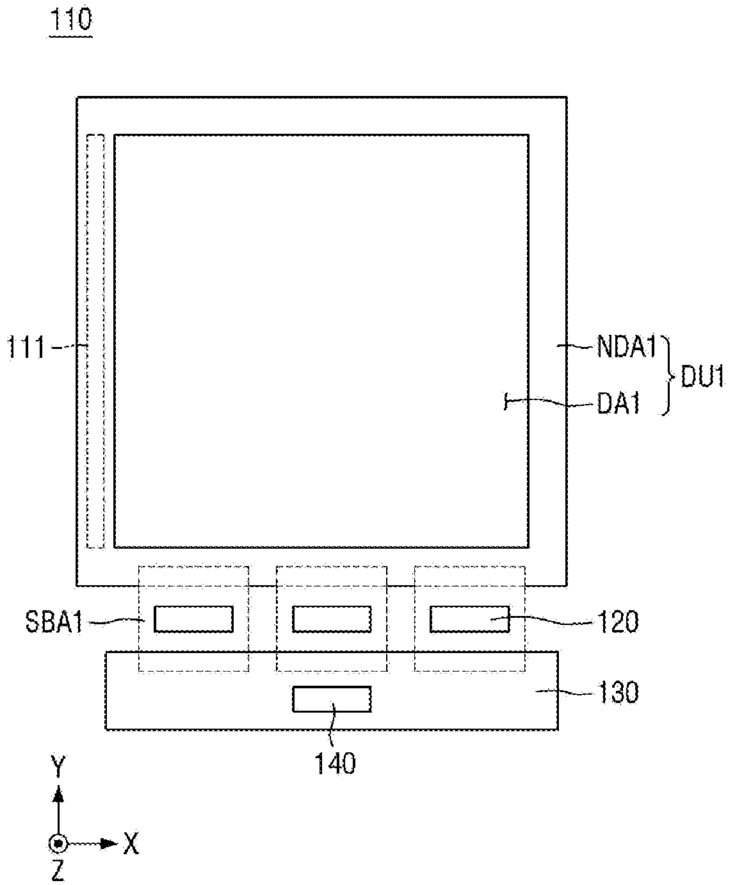
FIG. 16 is a detailed plan view of a surface light source device illustrated in FIG. 3.
Figure 17:
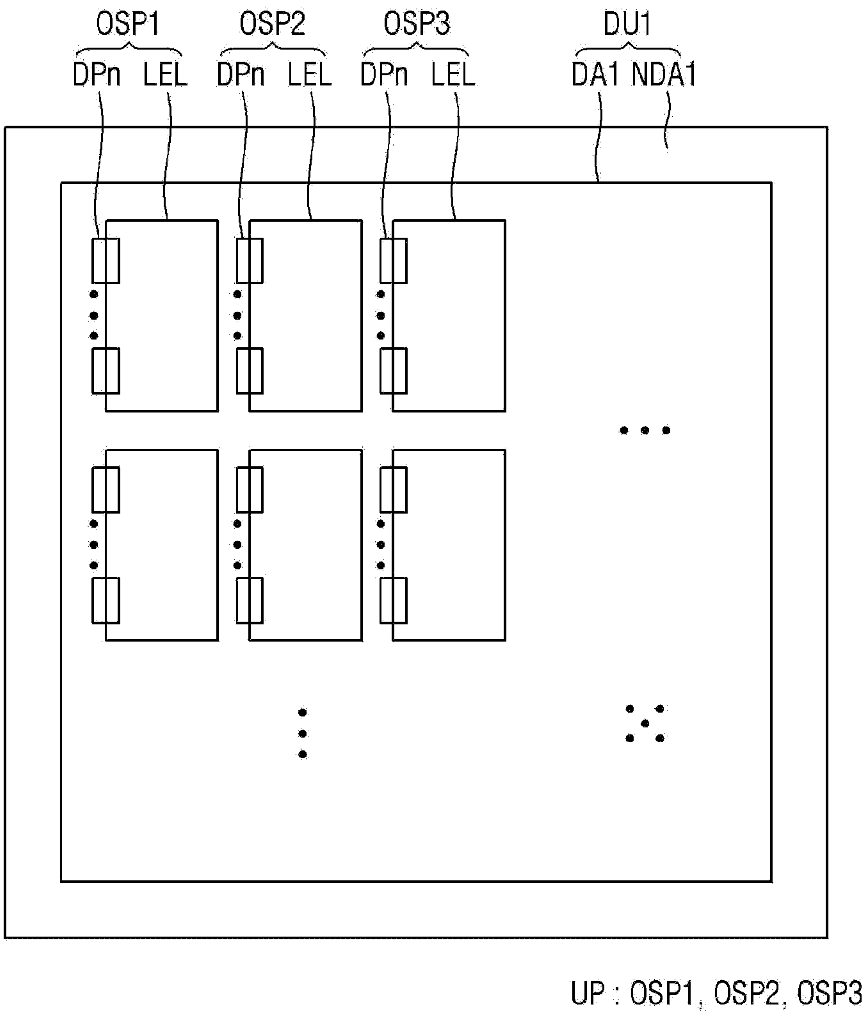
FIG. 17 is a plan view schematically illustrating the structure of a surface light emitting unit of the surface light source device illustrated in FIG. 16.

FIG. 16 is a detailed plan view of the surface light source device 110 illustrated in FIG. 3. FIG. 17 is a plan view schematically illustrating the structure of a surface light emitting unit DU1 of the surface light source device 110 illustrated in FIG. 16.

Referring to FIGS. 16 and 17, the surface light source device 110 may have a rectangular shape, a square shape, or a quadrate shape in a plan view. For example, when the spatial light modulator 210 is formed in a rectangular shape, a square shape, or a quadrate shape in a plan view, the surface light source device 110 may also have a rectangular shape, a square shape or a quadrate shape corresponding to the planar shape of the spatial light modulator 210. For example, the surface light source device 110 and the spatial light modulator 210 may also be formed in a rectangular shape with long sides located in the horizontal direction and short sides located in the vertical direction.

The surface light source device 110 includes the surface light emitting unit DU1 which displays background light as a surface light source. Here, for example, the surface light emitting unit DU1 may include a plurality of sub-light emitting pixels and may emit background light, which is a surface light source, through the sub-light emitting pixels. The sub-light emitting pixels in the surface light emitting unit DU1 are formed and arranged to correspond to a preset first resolution.

A first data processor 140 may extract extended reality content image data of the first resolution from extended reality content image data input from the outside or convert the extended reality content image data input from the outside into the extended reality content image data of the preset first resolution. Then, for example, the first data processor 140 may transmit the extended reality content image data of the first resolution to emission driving circuits 120 of the surface light source device 110.

The emission driving circuits 120 may output data signals and voltages for driving the sub-light emitting pixels of the surface light emitting unit DU1. Specifically, for example, the emission driving circuits 120 may receive extended reality content image data from the first data processor 140 such as, for example, a graphic card and arrange the extended reality content image data according to the preset first resolution. In an example, the emission driving circuits 120 may convert the extended reality content image data of the first resolution into analog image signals and supply the analog image signals to the sub-light emitting pixels arranged on an organic light emitting display surface DA1 of the surface light emitting unit DU1.

The organic light emitting display surface DA1 of the surface light emitting unit DU1 is an area that displays background light through surface light emission and may be defined as a central area of the surface light emitting unit DU1.

Sub-light emitting pixels OSP may be formed and disposed on the organic light emitting display surface DA1 in units of at least three. Accordingly, for example, the number of light emitting elements LEL disposed on the organic light emitting display surface DA1 may be a multiple of 3 (e.g., 3, 6, 9, 12, 15, 18 . . . ).

Specifically, for example, light emitting elements LEL of first through third sub-light emitting pixels OSP1 through OSP3 may be formed in a quadrangular shape such as, for example, a rectangle or a square in a plan view on the organic light emitting display surface DA1 formed in a quadrangular shape in a plan view.

Each unit light emitting pixel UP or the first through third sub-light emitting pixels OSP1 through OSP3 constituting each unit light emitting pixel UP may be formed and disposed in a vertical or horizontal stripe shape on the organic light emitting display surface DA1. The planar area of each light emitting element LEL is inversely proportional to the resolution value. That is, for example, as illustrated in FIG. 14, the planar area of each light emitting element LEL may be larger as the number of light emitting elements LEL disposed is smaller and the resolution is lower. Conversely, for example, the planar area of each light emitting element LEL may be smaller as the number of light emitting elements LEL disposed is larger and the resolution is higher. However, the light emitting elements LEL of the first through third sub-light emitting pixels OSP1 through OSP3 may have the same planar area.

A plurality of pixel drivers DP1 through DPn are connected to each light emitting element LEL formed in a quadrangular shape. The pixel drivers DP1 through DPn of each of the first through third sub-light emitting pixels OSP1 through OSP3 may partially overlap a light emitting element LEL and may be formed and disposed along at least any one side surface of the light emitting element LEL. The pixel drivers DP1 through DPn of each of the first through third sub-light emitting pixels OSP1 through OSP3 receive control signals and a data voltage at the same timing and drive the light emitting element LEL at the same driving timing.

Figure 18:
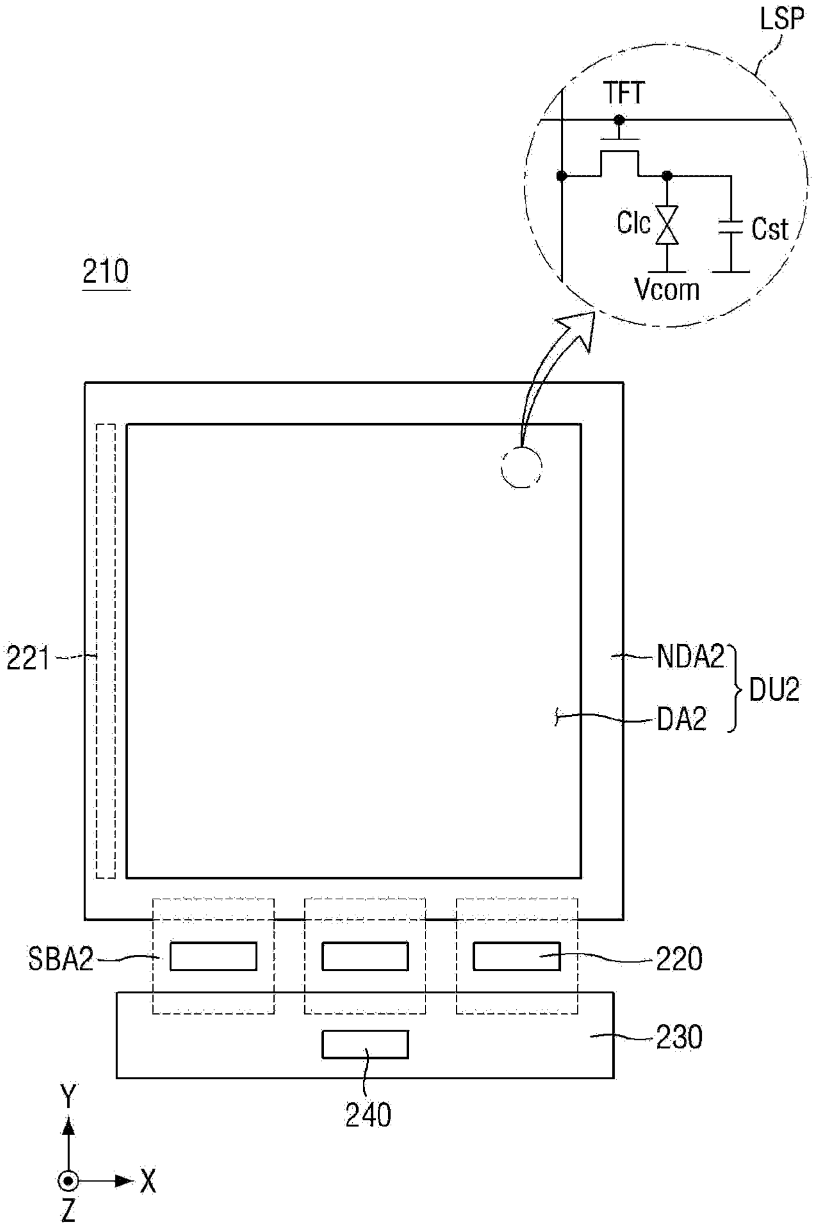
FIG. 18 is a detailed plan view of a spatial light modulator illustrated in FIG. 3.

FIG. 18 is a detailed plan view of the spatial light modulator 210 illustrated in FIG. 3.

Referring to FIG. 18, the spatial light modulator 210 serves as an extended reality content image display device that displays an extended reality content image on a front surface by using background light provided from the surface light source device 110 located behind the spatial light modulator 210.

The spatial light modulator 210 may be formed in the same planar shape as the surface light source device 110 that provides background light as a backlight and may have a rectangular shape, a square shape, a circular shape, an elliptical shape, or a quadrate shape in a plan view. For example, when the surface light source device 110 is formed in a rectangular shape, the spatial light modulator 210 may have a rectangular shape corresponding to the shape of the surface light source device 110 with long sides located in the horizontal direction. However, embodiments are not limited thereto. The long sides may also be located in the vertical direction, or the spatial light modulator 210 may also be rotatably installed such that long sides of the spatial light modulator 210 can be variably located in the horizontal or vertical direction. The spatial light modulator 210 may also be formed in a circular shape in a plan view, like the surface light source device 110.

Referring to FIG. 18, the spatial light modulator 210 includes a liquid crystal image display unit DU2 and a second data processor 240.

The liquid crystal image display unit DU2 may display an extended reality content image on a front surface by using background light provided from the surface light source device 110 located behind the spatial light modulator 210. The liquid crystal image display unit DU2 includes a plurality of liquid crystal pixels and may display an extended reality content image through the liquid crystal pixels. The liquid crystal pixels in the liquid crystal image display unit DU2 are formed and arranged such that the liquid crystal pixels correspond to a preset second resolution.

The second data processor 240 may supply extended reality content image data to display driving circuits 220 which drive the liquid crystal pixels of the liquid crystal image display unit DU2.

The second data processor 240 may extract extended reality content image data of the second resolution from extended reality content image data input from the outside or convert the extended reality content image data input from the outside into the extended reality content image data of the preset second resolution. Then, for example, the second data processor 240 may transmit the extended reality content image data of the second resolution to the display driving circuits 220 of the spatial light modulator 210.

The display driving circuits 220 of the spatial light modulator 210 may output data signals and voltages for driving the liquid crystal pixels of the liquid crystal image display unit DU2. Specifically, for example, the display driving circuits 220 may receive extended reality content image data from the second data processor 240 such as, for example, a graphic card and arrange the extended reality content image data according to the preset second resolution. In an example, the display driving circuits 220 may convert the extended reality content image data of the second resolution into analog image signals and supply the analog image signals to the liquid crystal pixels arranged on an image display surface DA2 of the liquid crystal image display unit DU2.

Figure 19:
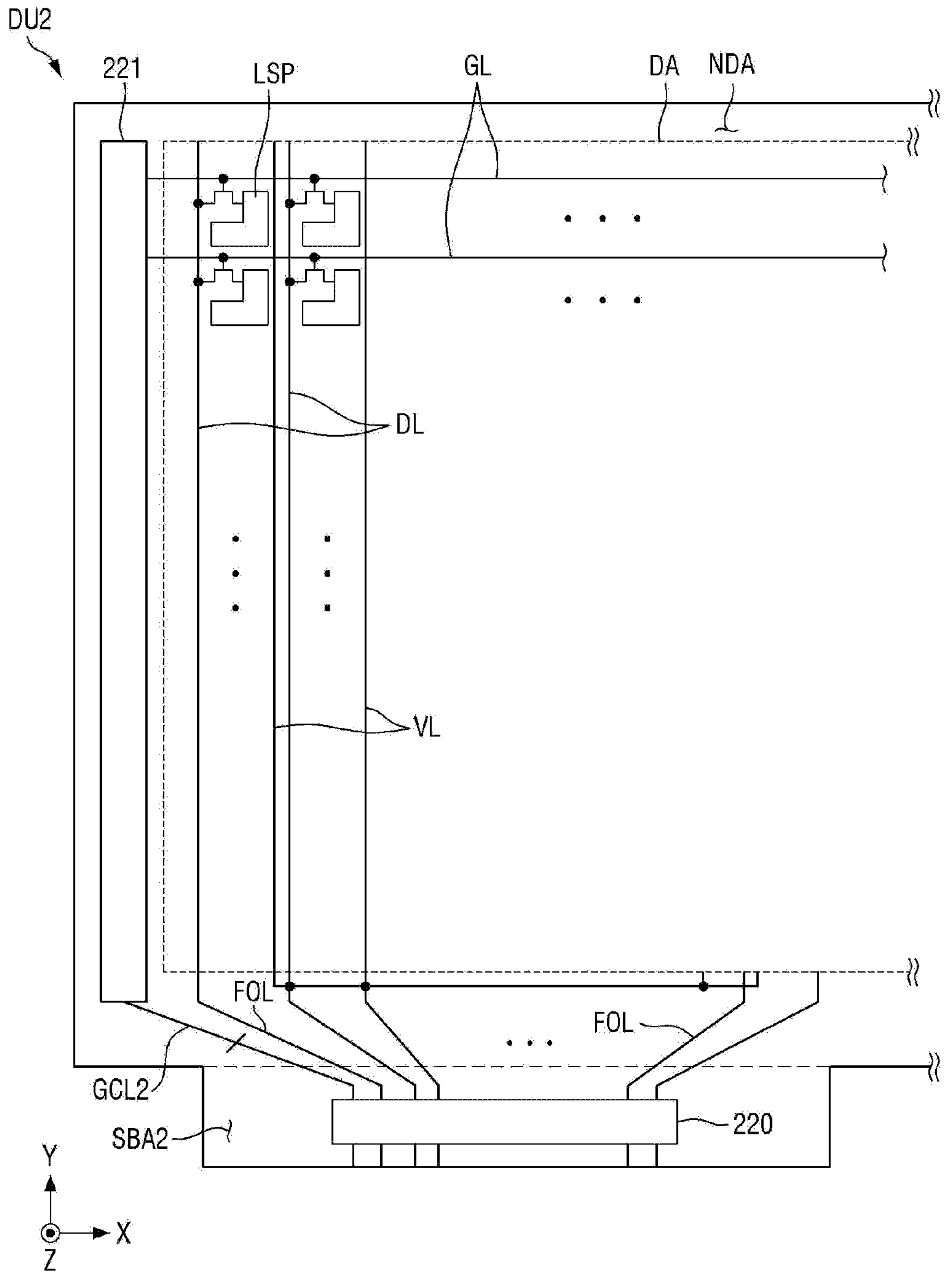
FIG. 19 is a plan view schematically illustrating the structure of a liquid crystal image display unit of the spatial light modulator illustrated in FIG. 18.

FIG. 19 is a plan view schematically illustrating the structure of the liquid crystal image display unit DU2 of the spatial light modulator 210 illustrated in FIG. 18.

Referring to FIGS. 18 and 19, the image display surface DA2 is an image display area that displays an extended reality content image and may be defined as a central area of the liquid crystal image display unit DU2. The image display surface DA2 may include a plurality of liquid crystal pixels LSP, a plurality of gate lines GL, a plurality of data lines DL, and a plurality of power lines VL. Each of the liquid crystal pixels LSP may be defined as a minimum unit that displays an extended reality content image by passing background light therethrough.

Each of the liquid crystal pixels LSP includes a data lines DL, a gate lines GL crossing the data line DL, a thin-film transistor TFT formed at an intersection of the data line DL and the gate line GL, a pixel electrode connected to the thin-film transistor TFT, a liquid crystal cell Cle formed in an area between the pixel electrode and a common electrode, and a storage capacitor Cst formed in parallel to the liquid crystal cell Clc. The liquid crystal cell Cle is driven by a difference voltage between a data voltage of the pixel electrode and a common voltage Vcom of the common electrode and an electric field according to the difference voltage. The liquid crystal cell Cle realizes image display light by diffracting and passing background light through the difference voltage between the data voltage and the common voltage Vcom and the electric field according to the difference voltage. A color filter may be disposed on each liquid crystal pixel LSP to display a color image.

The gate lines GL may supply gate signals received from a second gate driver 221 to the liquid crystal pixels LSP. The gate lines GL may extend in the X-axis direction and may be spaced apart from each other in the Y-axis direction crossing the X-axis direction.

The data lines DL may supply image data voltages received from a display driving circuit 220 to the liquid crystal pixels LSP. The data lines DL may extend in the Y-axis direction and may be spaced apart from each other in the X-axis direction.

The power lines VL may supply power supply voltages such as, for example, the common voltage Vcom received from the display driving circuit 220 to the liquid crystal pixels LSP.

A second non-display area NDA2 may include the second gate driver 221, fan-out lines FOL, and gate control lines GCL. The second gate driver 221 may generate a plurality of gate signals based on a gate control signal and may sequentially supply the gate signals to the gate lines GL according to a set order.

The fan-out lines FOL may extend from the display driving circuit 220 to the image display surface DA2. The fan-out lines FOL may supply data voltages received from the display driving circuit 220 to the data lines DL.

The second gate control lines GCL2 may extend from the display driving circuit 220 to the second gate driver 221. The second gate control lines GCL2 may supply gate control signals received from the display driving circuit 220 to the second gate driver 221.

The display driving circuit 220 may output control signals and image data voltages for driving the liquid crystal pixels LSP of the image display surface DA2 to the fan-out lines FOL. The display driving circuit 220 may supply image data voltages to the data lines DL through the fan-out lines FOL. The image data voltages may be supplied to the liquid crystal pixels LSP and may determine luminances of the liquid crystal pixels LSP. The display driving circuit 220 may supply gate control signals to the second gate driver 221 through the gate control lines GCL.

Figure 20:
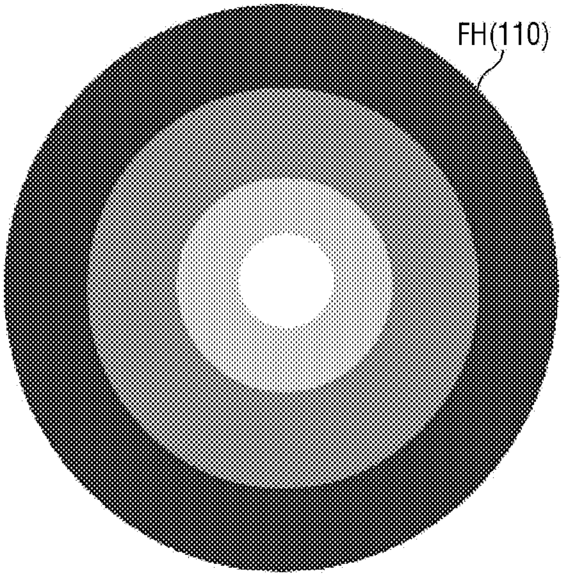
FIG. 20 illustrates background light and background light display resolution of a surface light source device according to an embodiment.

FIG. 20 illustrates background light and background light display resolution of a surface light source device 110 according to an embodiment.

Referring to FIG. 20, a first data processor 140 of the surface light source device 110 may convert extended reality content image data input from the outside into extended reality content image data of a preset first resolution. Then, for example, the first data processor 140 may transmit the extended reality content image data of the first resolution to an emission driving circuit 120 of the surface light source device 110.

The emission driving circuit 120 of the surface light source device 110 may receive the extended reality content image data of the first resolution from the first data processor 140 and arrange the extended reality content image data according to the first resolution. In an example, the emission driving circuit 120 may convert the extended reality content image data of the first resolution into analog image signals and supply the analog image signals to sub-light emitting pixels arranged on an organic light emitting display surface DA1 of a surface light emitting unit DU1. An image FH (110) according to the first resolution is displayed on the organic light emitting display surface DA1 of the surface light emitting unit DU1 by the sub-light emitting pixels of the surface light source device 110, and image display light according to the first resolution is provided to the spatial light modulator 210 by the surface light source device 110 as a surface light source and as background light.

Figure 21:
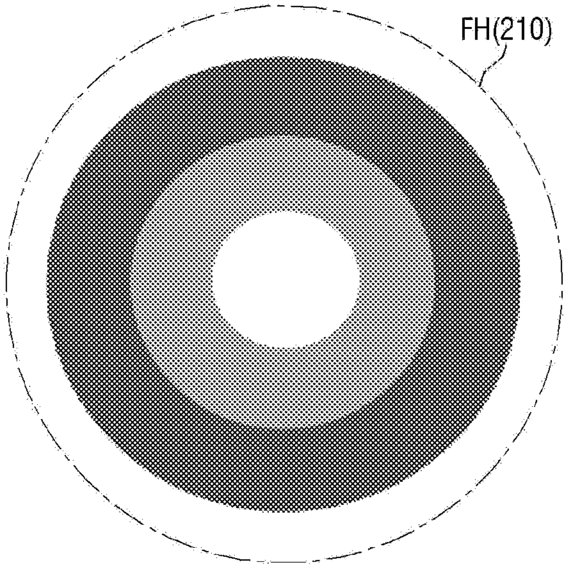
FIG. 21 illustrates a display image and image display resolution of a spatial light modulator according to an embodiment.

FIG. 21 illustrates a display image and image display resolution of a spatial light modulator 210 according to an embodiment.

Referring to FIG. 21, a second data processor 240 of the spatial light modulator 210 converts extended reality content image data input from the outside into extended reality content image data of a preset second resolution. Then, for example, the second data processor 240 may transmit the extended reality content image data of the second resolution to a display driving circuit 220 of the spatial light modulator 210.

As described herein, the second resolution of the spatial light modulator 210 may be set to be different from the first resolution of the surface light source device 110. That is, for example, the second resolution of the spatial light modulator 210 may be set to be higher than the first resolution of the surface light source device 110.

The display driving circuit 220 of the spatial light modulator 210 may receive the extended reality content image data of the second resolution from the second data processor 240 and arrange the extended reality content image data according to the preset second resolution. Then, for example, the display driving circuit 220 may convert the extended reality content image data of the second resolution into analog image signals and supply the analog image signals to liquid crystal pixels arranged on an image display surface DA2 of a liquid crystal image display unit DU2. Accordingly, for example, the spatial light modulator 210 may generate an extended reality content image FH (210) of the second resolution higher than the first resolution by using the background light of the first resolution provided from the surface light source device 110 and displays the extended reality content image FH (210) on a front surface.

Figure 22:
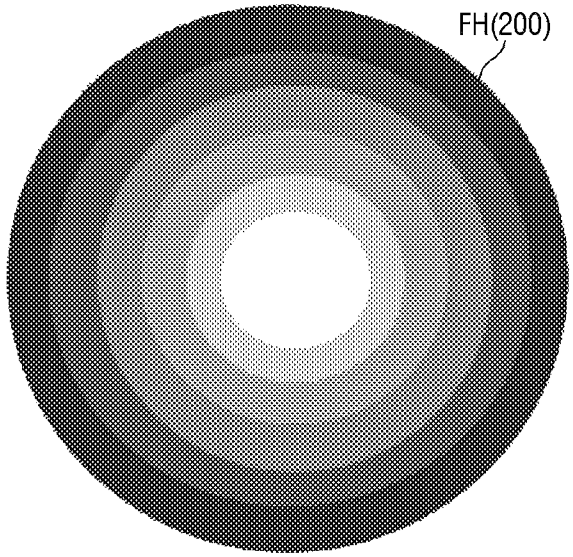
FIG. 22 illustrates the resolution of an extended reality content image displayed through a display device according to an embodiment.

FIG. 22 illustrates the resolution of an extended reality content image displayed through a display device according to an embodiment of the present disclosure.

Referring to FIG. 22, the background light of the first resolution provided from the surface light source device 110 and the extended reality content image FH (210) (e.g., of FIG. 21) of the second resolution according to the spatial light modulator 210 are mixed such that an extended reality content image FH (200) of a third resolution is displayed on the front surface of the spatial light modulator 210.

The extended reality content image FH (200) of the third resolution is supplied to an image transmission member 310, and the image transmission member 310 may form a display path (or light path) of the extended reality content image FH (200) such that the extended reality content image FH of the third resolution can be displayed on a preset space or display surface. Accordingly, for example, the extended reality content image FH displayed through at least one spatial light modulator 210 is directed to a specific space through an optical waveguide, a diffusion lens, and at least one focusing lens and recognized as the extended reality content image FH (200) in a real space.

In a display device according to an embodiment of the present disclosure, the light emitting pixel arrangement structure and surface light emitting structure of a surface light source device are simplified such that ultra-low resolution background light can be provided to a spatial light modulator. Therefore, for example, the light emitting pixel arrangement structure and surface light emitting structure of the surface light source device as described herein support increasing the efficiency of manufacturing the display device that displays an extended reality content image such as, for example, a hologram.

In addition, for example, in a display device according to embodiments of the present disclosure, the RC value of a light emitting element of each light emitting pixel is reduced. Therefore, the reduction of the RC value may result in improving the amount of light emitted from each light emitting element and further increasing the resolution and 3D effect of an extended reality content image such as, for example, a hologram.

However, the effects of the present disclosure are not restricted to the one set forth herein. The above and other effects of the present disclosure will become more apparent to one of daily skill in the art to which the present disclosure pertains by referencing the claims.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense and not for purposes of limitation.

What is claimed is:

1. A display device comprising:
at least one spatial light modulator displaying an extended reality content image;
a surface light source device located behind the at least one spatial light modulator and providing image display light of a first resolution to the at least one spatial light modulator as background light; and
at least one image transmission member forming a display path of the extended reality content image,
wherein the surface light source device comprises an organic light emitting display unit in which a plurality of sub-light emitting pixels performing surface light emission are arranged and an emission driving circuit driving the plurality of sub-light emitting pixels, and each of the plurality of sub-light emitting pixels comprises a plurality of pixel drivers and a light emitting element.

2. The display device of claim 1, wherein:
the emission driving circuit generates gate control signals and analog image signals for driving the plurality of sub-light emitting pixels at a same timing in units of at least one frame,
the display device supplies the gate control signals to a first gate driver in units of at least one frame, and
the display device supplies the analog image signals simultaneously to the plurality of sub-light emitting pixels.

3. The display device of claim 2, wherein:
the light emitting element is connected in parallel to the plurality of pixel drivers and emits light in response to one or more driving currents provided by the plurality of pixel drivers, and
the plurality of pixel drivers drive the light emitting element such that the light emitting element emits light, based on control signals and an analog image signal, wherein the plurality of pixel drivers receive the control signals and the analog image signal at a same timing through the emission driving circuit and the first gate driver.

4. The display device of claim 2, wherein the light emitting element is included in each of the plurality of sub-light emitting pixels and is formed in the organic light emitting display unit in at least one or a combination of different shapes comprising: a sector shape, a triangular shape, a rhombus shape, a quadrangular shape, a circular shape, a semicircular shape, and an elliptical shape.

5. The display device of claim 4, wherein the light emitting elements respectively included in the plurality of sub-light emitting pixels are disposed in the circular shape in a plan view such that the light emitting elements surround a center of an organic light emitting display unit according to the circular shape or are disposed in the quadrangular shape in the plan view by such that the light emitting elements surround the center of the organic light emitting display unit according to the quadrangular shape.

6. The display device of claim 4, further comprising:
a plurality of unit light emitting pixels alternately and repeatedly disposed on the organic light emitting display unit, wherein:
each unit light emitting pixel emits white light and is comprised of three sub-light emitting pixels respectively displaying red light, green light and blue light, and
a combination of the three sub-light emitting pixels disposed in each unit light emitting pixel is formed in the sector shape, the triangular shape, and the rhombus shape in a plan view.

7. The display device of claim 6, wherein:
a light emitting element included in any one of the three sub-light emitting pixels of each unit light emitting pixel is formed in a triangular shape, and
light emitting elements included in the other two of the three sub-light emitting pixels are formed in a rhombus shape such that each unit light emitting pixel comprised of a combination of the three sub-light emitting pixels is formed and disposed in the sector shape.

8. The display device of claim 6, wherein:
the three sub-light emitting pixels of each unit light emitting pixel are disposed in a circular shape in a plan view such that the three sub-light emitting pixels surround a center of the organic light emitting display unit in a circular shape; and
the three sub-light emitting pixels are formed such that respective planar areas of the three sub-light emitting pixels are the same.

9. The display device of claim 2, wherein the light emitting element comprises:
a first planar electrode extending from a drain terminal formed in at least one transistor of each of the plurality of pixel drivers and disposed in a plane in an emission area;
a first light emitting electrode formed in the emission area, wherein the first light emitting electrode covers the first planar electrode and overlaps a portion of a front surface of the first planar electrode;
an organic light emitting layer formed and disposed on a front surface of the first light emitting electrode; and
a common electrode formed and disposed such that the common electrode covers a front surface of the organic light emitting layer.

10. The display device of claim 2, wherein the light emitting element comprises:
a floating gate electrode formed through a same process as a gate electrode formed in at least one transistor of each of the plurality of pixel drivers, electrically separated from the gate electrode, and disposed in a plane in an emission area in which the light emitting element is formed;
a first planar electrode extending from a drain terminal formed in the at least one transistor and formed in the emission area, wherein the first planar electrode covers the floating gate electrode and overlaps a portion of a front surface of the floating gate electrode;
a first light emitting electrode formed in the emission area, wherein the first light emitting electrode covers the first planar electrode and overlaps a portion of a front surface of the first planar electrode;
an organic light emitting layer formed and disposed on a front surface of the first light emitting electrode; and
a common electrode formed and disposed on a front surface of the organic light emitting layer, wherein the common electrode covers the front surface of the organic light emitting layer.

11. The display device of claim 2, wherein the light emitting element comprises:

a floating gate electrode formed through a same process as a gate electrode formed in at least one transistor of each of the plurality of pixel drivers, electrically separated from the gate electrode, and disposed in a plane in an emission area in which the light emitting element is formed;

a floating capacitor electrode formed through a same process as a capacitor electrode formed in the at least one transistor, electrically separated from the capacitor electrode, and formed in the emission area, wherein the floating capacitor electrode covers the floating gate electrode and overlaps a portion of a front surface of the floating gate electrode;

a first planar electrode extending from a drain terminal formed in the at least one transistor and formed in the emission area, wherein the first planar electrode covers the floating capacitor electrode and overlaps a portion of a front surface of the floating capacitor electrode;

a first light emitting electrode formed in the emission area, wherein the first light emitting electrode covers the first planar electrode and overlaps a portion of a front surface of the first planar electrode;

an organic light emitting layer formed and disposed on a front surface of the first light emitting electrode; and a common electrode formed and disposed such that the common electrode covers a front surface of the organic light emitting layer.

12. The display device of claim 2, wherein:

the surface light source device further comprises a first data processor, and the first data processor extracts extended reality content image data of the first resolution from extended reality content image data input from outside or converts the extended reality content image data input from the outside into the extended reality content image data of the first resolution, and the emission driving circuit converts the extended reality content image data of the first resolution into analog image signals and supplies the analog image signals to the plurality of sub-light emitting pixels of the organic light emitting display unit.

13. The display device of claim 12, wherein:

the at least one spatial light modulator generates an extended reality content image of a second resolution by using the image display light of the first resolution as the background light, and the at least one image transmission member forms a display path of an extended reality content image of a third resolution in which the image display light of the first resolution and the extended reality content image of the second resolution are mixed, wherein the first resolution is a preset resolution lower than the second resolution, and the third resolution is a mixture of the first resolution and the second resolution.

14. The display device of claim 1, wherein the surface light source device generates the image display light of the first resolution as a surface light source by:

converting extended reality content image data input from outside the display device into extended reality content image data of the first resolution, converting the extended reality content image data of the first resolution into analog image signals, and supplying the analog image signals to the plurality of sub-light emitting pixels of the organic light emitting display unit.

15. The display device of claim 14, wherein:

the at least one spatial light modulator:

converts the extended reality content image data input from outside the display device into extended reality content image data of a second resolution, converts the extended reality content image data of the second resolution into analog image signals and supplies the analog image signals to liquid crystal pixels of a liquid crystal image display unit, and generates an extended reality content image of the second resolution by using, as the background light, the image display light of the first resolution provided from the surface light source device located behind the at least one spatial light modulator, and the at least one image transmission member forms a display path of an extended reality content image of a third resolution in which the image display light of the first resolution and the extended reality content image of the second resolution are mixed.

16. A display device comprising:

at least one spatial light modulator displaying an extended reality content image;

a surface light source device located behind the at least one spatial light modulator and providing image display light of a first resolution to the at least one spatial light modulator as background light; and at least one image transmission member forming a display path of the extended reality content image, wherein the surface light source device comprises:

an organic light emitting display unit in which a plurality of sub-light emitting pixels performing surface light emission are arranged; and an emission driving circuit driving the plurality of sub-light emitting pixels, wherein each of the plurality of sub-light emitting pixels comprises a plurality of pixel drivers and a light emitting element, and the light emitting element included in each of the plurality of sub-light emitting pixels is formed in the organic light emitting display unit in at least one of or a combination of different shapes comprising: a sector shape, a triangular shape, a rhombus shape, a quadrangular shape, a circular shape, a semicircular shape, and an elliptical shape.

17. The display device of claim 16, wherein:

the emission driving circuit generates gate control signals and analog image signals for driving the plurality of sub-light emitting pixels at a same timing in units of at least one frame, the display device supplies the gate control signals are supplied to a first gate driver in units of at least one frame, and the display device supplies the analog image signals simultaneously the plurality of sub-light emitting pixels.

18. The display device of claim 17, wherein the light emitting element comprises:

a first planar electrode extending from a drain terminal formed in at least one transistor of each of the plurality of pixel drivers and disposed in a plane in an emission area;

a first light emitting electrode formed in the emission area, wherein the first light emitting electrode covers the first planar electrode and overlaps a portion of a front surface of the first planar electrode;

an organic light emitting layer formed and disposed on a front surface of the first light emitting electrode; and a common electrode formed and disposed such that the common electrode covers a front surface of the organic light emitting layer.

19. The display device of claim 17, wherein the light emitting element comprises:

a floating gate electrode formed through a same process as a gate electrode formed in at least one transistor of each of the plurality of pixel drivers, electrically separated from the gate electrode, and disposed in a plane in an emission area in which the light emitting element is formed;

a first planar electrode extending from a drain terminal formed in the at least one transistor and formed in the emission area, wherein the first planar electrode covers the floating gate electrode and overlaps a portion of a front surface of the floating gate electrode;

a first light emitting electrode formed in the emission area to cover the first planar electrode and overlap a portion of a front surface of the first planar electrode;

an organic light emitting layer formed and disposed on a front surface of the first light emitting electrode; and a common electrode formed and disposed on a front surface of the organic light emitting layer, wherein the common electrode covers the front surface of the organic light emitting layer.

20. The display device of claim 17, wherein the light emitting element comprises:

a floating gate electrode formed through a same process as a gate electrode formed in at least one transistor of each of the plurality of pixel drivers, electrically separated from the gate electrode, and disposed in a plane in an emission area in which the light emitting element is formed;

a floating capacitor electrode formed through a same process as a capacitor electrode formed in the at least one transistor, electrically separated from the capacitor electrode, and formed in the emission area, wherein the floating capacitor electrode covers the floating gate electrode and overlaps a portion of a front surface of the floating gate electrode;

a first planar electrode extending from a drain terminal formed in the at least one transistor and formed in the emission area, wherein the first planar electrode covers the floating capacitor electrode and overlaps a portion of a front surface of the floating capacitor electrode;

a first light emitting electrode formed in the emission area, wherein the first light emitting electrode covers the first planar electrode and overlaps a portion of a front surface of the first planar electrode;

an organic light emitting layer formed and disposed on a front surface of the first light emitting electrode; and a common electrode formed and disposed such that the common electrode covers a front surface of the organic light emitting layer.

* * * * *